United States Patent
Chriki et al.

(10) Patent No.: US 12,455,450 B2
(45) Date of Patent: Oct. 28, 2025

(54) MIXED REALITY COMBINER

(71) Applicant: LUMUS LTD., Ness Ziona (IL)

(72) Inventors: Ronen Chriki, Lod (IL); Elad Sharlin, Mishmar David (IL); Yochay Danziger, Kfar Vradim (IL)

(73) Assignee: LUMUS LTD., Ness Ziona (IL)

( * ) Notice: Subject to any disclaimer, the term of this patent is extended or adjusted under 35 U.S.C. 154(b) by 788 days.

(21) Appl. No.: 17/776,126

(22) PCT Filed: Feb. 22, 2021

(86) PCT No.: PCT/IL2021/050206
§ 371 (c)(1),
(2) Date: May 11, 2022

(87) PCT Pub. No.: WO2021/171289
PCT Pub. Date: Sep. 2, 2021

(65) Prior Publication Data
US 2022/0397766 A1 Dec. 15, 2022

Related U.S. Application Data

(60) Provisional application No. 63/001,567, filed on Mar. 30, 2020, provisional application No. 62/980,469, filed on Feb. 24, 2020.

(51) Int. Cl.
*G02B 27/01* (2006.01)
*F21V 8/00* (2006.01)
*G02B 27/14* (2006.01)

(52) U.S. Cl.
CPC ....... *G02B 27/0172* (2013.01); *G02B 6/0026* (2013.01); *G02B 6/0031* (2013.01); *G02B 27/14* (2013.01)

(58) Field of Classification Search
None
See application file for complete search history.

(56) References Cited

U.S. PATENT DOCUMENTS

| | | | |
|---|---|---|---|
| 2,748,659 | A | 6/1956 | Geffcken et al. |
| 2,795,069 | A | 6/1957 | Hardesty |

(Continued)

FOREIGN PATENT DOCUMENTS

| | | |
|---|---|---|
| CN | 109239835 A | 1/2019 |
| JP | 2003140081 A | 5/2003 |
| WO | 2015192117 A1 | 12/2015 |

OTHER PUBLICATIONS

Mukawa et al, "A full-color eyewear display using planar waveguides with reflection volume holograms", Mar. 2009, Information Display 25(3):27-27, DOI:10.1002/j.2637-496X.2009.tb00066.x, 10 pages.

(Continued)

*Primary Examiner* — Richard H Kim
(74) *Attorney, Agent, or Firm* — Scully, Scott, Murphy & Presser

(57) ABSTRACT

An optical waveguide combiner having an output coupler comprising an array of embedded partially reflective dielectric mirrors expanding and coupling a virtual, optionally color, image generated by a laser display engine into a user EMB, wherein the dielectric mirrors are configured having a wavelength band for each lasing band of the laser display engine that includes wavelengths of light in the lasing band and in a range of wavelengths over which the lasing band is expected to drift, a reflectivity angular range exhibiting a first reflectivity, a transmittance angular range exhibiting a second reflectivity less than the first reflectivity, and a see-thru angular transmittance range having high transmittance for natural light incident on the facets.

18 Claims, 11 Drawing Sheets

(56) References Cited

U.S. PATENT DOCUMENTS

| | | |
|---|---|---|
| 2,886,911 A | 5/1959 | Hardesty |
| 3,491,245 A | 1/1970 | Hardesty |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 4,084,883 A | 4/1978 | Eastman et al. |
| 4,191,446 A | 3/1980 | Arditty et al. |
| 4,309,070 A | 1/1982 | St. Leger Searle |
| 4,331,387 A | 5/1982 | Wentz |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,720,189 A | 1/1988 | Heynen et al. |
| 4,775,217 A | 10/1988 | Ellis |
| 4,798,448 A | 1/1989 | van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,208,800 A | 5/1993 | Isobe et al. |
| 5,231,642 A | 7/1993 | Scifres et al. |
| 5,235,589 A | 8/1993 | Yokomori et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,430,505 A | 7/1995 | Katz |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Machler |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Friesem et al. |
| 5,982,536 A | 11/1999 | Swan et al. |
| 5,999,836 A | 12/1999 | Nelson et al. |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,154,321 A | 11/2000 | Melville et al. |
| 6,231,992 B1 | 5/2001 | Niebauer et al. |
| 6,264,328 B1 | 7/2001 | Williams et al. |
| 6,356,392 B1 | 3/2002 | Spitzer |
| 6,490,104 B1 | 12/2002 | Gleckman et al. |
| 6,626,906 B1 | 9/2003 | Young |
| 6,671,100 B1 | 12/2003 | McRuer |
| 6,762,801 B2 | 7/2004 | Weiss et al. |
| 6,799,859 B1 | 10/2004 | Ida et al. |
| 6,829,095 B2 | 12/2004 | Amitai |
| 6,927,694 B1 | 8/2005 | Smith et al. |
| 7,391,573 B2 | 6/2008 | Amitai |
| 7,457,040 B2 | 11/2008 | Amitai |
| 7,724,443 B2 | 5/2010 | Amitai |
| 7,751,122 B2 | 7/2010 | Amitai |
| 7,839,575 B2 | 11/2010 | DeJong et al. |
| 7,949,252 B1 | 5/2011 | Georgiev |
| 8,140,197 B2 | 3/2012 | Lapidot et al. |
| 8,187,481 B1 | 5/2012 | Hobbs |
| 8,405,573 B2 | 3/2013 | Lapidot et al. |
| 8,472,119 B1 | 6/2013 | Kelly |
| 8,655,178 B2 | 2/2014 | Capron et al. |
| 8,665,178 B1 | 3/2014 | Wang |
| 8,736,963 B2 | 5/2014 | Robbins et al. |
| 8,743,464 B1 | 6/2014 | Amirparviz |
| 8,870,384 B2 | 10/2014 | Imai et al. |
| 9,025,253 B2 | 5/2015 | Hadad et al. |
| 9,039,906 B2 | 5/2015 | Schulz et al. |
| 9,285,591 B1 | 3/2016 | Gupta et al. |
| 9,741,175 B2 | 8/2017 | Mukawa |
| 9,798,061 B2 | 10/2017 | Hsiao et al. |
| 9,805,633 B2 | 10/2017 | Zheng et al. |
| 9,857,586 B2 | 1/2018 | Shimatani et al. |
| 10,078,222 B2 | 9/2018 | Komatsu et al. |
| 10,133,070 B2 | 11/2018 | Danziger |
| 10,222,535 B2 | 3/2019 | Remhof et al. |
| 10,386,563 B2 | 8/2019 | Ishii et al. |
| 10,437,068 B2 | 10/2019 | Weng et al. |
| 10,564,430 B2 | 2/2020 | Amitai et al. |
| 11,099,737 B2 | 8/2021 | Abe et al. |
| 11,340,458 B2 | 5/2022 | Amitai et al. |
| 2002/0015233 A1 | 2/2002 | Park |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0090439 A1 | 5/2003 | Spitzer et al. |
| 2003/0165017 A1 | 9/2003 | Amitai |
| 2003/0197938 A1 | 10/2003 | Schmidt et al. |
| 2003/0218718 A1 | 11/2003 | Moliton et al. |
| 2004/0032660 A1 | 2/2004 | Amitai |
| 2004/0033528 A1 | 2/2004 | Amitai |
| 2004/0085649 A1 | 5/2004 | Repetto et al. |
| 2004/0137189 A1 | 7/2004 | Tellini et al. |
| 2005/0018308 A1 | 1/2005 | Cassarly et al. |
| 2005/0073577 A1 | 4/2005 | Sudo et al. |
| 2005/0078388 A1 | 4/2005 | Amitai |
| 2005/0083592 A1 | 4/2005 | Amitai et al. |
| 2005/0084210 A1 | 4/2005 | Cha |
| 2005/0174641 A1 | 8/2005 | Greenberg et al. |
| 2005/0174658 A1 | 8/2005 | Long et al. |
| 2005/0180687 A1 | 8/2005 | Amitai |
| 2005/0225866 A1 | 10/2005 | Abu-Ageel |
| 2005/0265044 A1 | 12/2005 | Chen et al. |
| 2006/0126182 A1 | 6/2006 | Levola |
| 2006/0146518 A1 | 7/2006 | Dubin et al. |
| 2006/0153518 A1 | 7/2006 | Abu-Ageel |
| 2006/0221448 A1 | 10/2006 | Nivon et al. |
| 2006/0268421 A1 | 11/2006 | Shimizu et al. |
| 2007/0002191 A1 | 1/2007 | Hashizume et al. |
| 2007/0070859 A1 | 3/2007 | Hirayama |
| 2007/0091445 A1 | 4/2007 | Amitai |
| 2007/0097513 A1 | 5/2007 | Amitai |
| 2007/0155277 A1 | 7/2007 | Amitai et al. |
| 2007/0165192 A1 | 7/2007 | Prior et al. |
| 2007/0273611 A1 | 11/2007 | Torch |
| 2008/0025667 A1 | 1/2008 | Amitai |
| 2008/0094586 A1 | 4/2008 | Hirayama |
| 2008/0106775 A1 | 5/2008 | Amitai et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2009/0052046 A1 | 2/2009 | Amitai |
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0190222 A1 | 7/2009 | Simmonds et al. |
| 2010/0067110 A1 | 3/2010 | Hadad et al. |
| 2010/0111472 A1 | 5/2010 | DeJong |
| 2010/0171680 A1 | 7/2010 | Lapidot et al. |
| 2010/0202128 A1 | 8/2010 | Saccomanno |
| 2010/0278480 A1 | 11/2010 | Vasylyev |
| 2010/0291489 A1 | 11/2010 | Moskovits et al. |
| 2011/0109880 A1 | 5/2011 | Nummela |
| 2011/0242661 A1 | 10/2011 | Simmonds |

(56) References Cited

U.S. PATENT DOCUMENTS

| | | |
|---|---|---|
| 2012/0039576 A1 | 2/2012 | Dangel et al. |
| 2012/0062998 A1 | 3/2012 | Schultz et al. |
| 2012/0120498 A1 | 5/2012 | Harrison et al. |
| 2012/0147361 A1 | 6/2012 | Mochizuki et al. |
| 2012/0179369 A1 | 7/2012 | Lapidot et al. |
| 2012/0206817 A1 | 8/2012 | Totani et al. |
| 2012/0306940 A1 | 12/2012 | Machida et al. |
| 2013/0007704 A1 | 1/2013 | Haynes et al. |
| 2013/0007833 A1 | 1/2013 | Kitazato et al. |
| 2013/0070344 A1 | 3/2013 | Takeda et al. |
| 2013/0208362 A1 | 8/2013 | Bohn et al. |
| 2013/0229717 A1 | 9/2013 | Amitai |
| 2013/0242392 A1 | 9/2013 | Amirparviz et al. |
| 2013/0276960 A1 | 10/2013 | Amitai |
| 2013/0279017 A1 | 10/2013 | Amitai |
| 2013/0321432 A1 | 12/2013 | Burns |
| 2013/0334504 A1 | 12/2013 | Thompson et al. |
| 2014/0003762 A1 | 1/2014 | Macnamara |
| 2014/0014065 A1 | 1/2014 | Hayashi et al. |
| 2014/0016051 A1 | 1/2014 | Kroll et al. |
| 2014/0019801 A1 | 1/2014 | Sutton et al. |
| 2014/0043688 A1 | 2/2014 | Schrader |
| 2014/0104665 A1 | 4/2014 | Popovich et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1 | 5/2014 | Amitai et al. |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0185142 A1 | 7/2014 | Gupta et al. |
| 2014/0226215 A1 | 8/2014 | Komatsu et al. |
| 2014/0374377 A1 | 12/2014 | Schulz et al. |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0160529 A1 | 6/2015 | Popovich et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0207990 A1 | 7/2015 | Ford et al. |
| 2015/0219834 A1 | 8/2015 | Nichol et al. |
| 2015/0243091 A1 | 8/2015 | Schowengerdt |
| 2015/0277127 A1 | 10/2015 | Amitai |
| 2015/0289762 A1 | 10/2015 | Popovich et al. |
| 2015/0293360 A1 | 10/2015 | Amitai |
| 2015/0338655 A1 | 11/2015 | Sawada et al. |
| 2016/0020965 A1 | 1/2016 | Sakata et al. |
| 2016/0109712 A1 | 4/2016 | Harrison et al. |
| 2016/0116739 A1 | 4/2016 | TeKolste et al. |
| 2016/0116743 A1 | 4/2016 | Amitai |
| 2016/0161740 A1 | 6/2016 | Bar-Zeev et al. |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0189432 A1 | 6/2016 | Bar-Zeev et al. |
| 2016/0207457 A1 | 7/2016 | Border et al. |
| 2016/0209648 A1 | 7/2016 | Haddick et al. |
| 2016/0234485 A1 | 8/2016 | Robbins et al. |
| 2016/0266387 A1 | 9/2016 | TeKolste et al. |
| 2016/0314564 A1 | 10/2016 | Jones et al. |
| 2016/0341964 A1 | 11/2016 | Amitai |
| 2016/0349518 A1 | 12/2016 | Amitai et al. |
| 2017/0003504 A1 | 1/2017 | Vallius et al. |
| 2017/0017095 A1 | 1/2017 | Fricker et al. |
| 2017/0045744 A1 | 2/2017 | Amitai |
| 2017/0052369 A1 | 2/2017 | Shimatani et al. |
| 2017/0052376 A1 | 2/2017 | Amitai |
| 2017/0052377 A1 | 2/2017 | Amitai |
| 2017/0122725 A1 | 5/2017 | Yeoh et al. |
| 2017/0242249 A1 | 8/2017 | Wall et al. |
| 2017/0276947 A1 | 9/2017 | Yokoyama |
| 2017/0285346 A1 | 10/2017 | Pan |
| 2017/0293140 A1 | 10/2017 | Cai et al. |
| 2017/0336636 A1 | 11/2017 | Amitai et al. |
| 2017/0343822 A1 | 11/2017 | Border et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2017/0371160 A1 | 12/2017 | Schultz |
| 2018/0023177 A1 | 1/2018 | Rachiele et al. |
| 2018/0033562 A1 | 2/2018 | Chung et al. |
| 2018/0039082 A1 | 2/2018 | Amitai |
| 2018/0067315 A1 | 3/2018 | Amitai et al. |
| 2018/0101087 A1 | 4/2018 | Shinohara |
| 2018/0157057 A1 | 6/2018 | Gelberg et al. |
| 2018/0210202 A1 | 7/2018 | Danziger |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0284447 A1 | 10/2018 | Matsuki et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0227317 A1 | 7/2019 | Trail et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0183159 A1 | 6/2020 | Danziger |
| 2020/0183170 A1 | 6/2020 | Amitai et al. |
| 2020/0192089 A1 | 6/2020 | Haddick et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292818 A1* | 9/2020 | Amitai ............... G02B 27/0101 |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |

(56) References Cited

U.S. PATENT DOCUMENTS

| | | |
|---|---|---|
| 2021/0173480 A1 | 6/2021 | Osterhout et al. |
| 2021/0239898 A1 | 8/2021 | Danziger et al. |
| 2021/0271006 A1 | 9/2021 | Ronen et al. |
| 2022/0244546 A1 | 8/2022 | Amitai |

OTHER PUBLICATIONS

Zhang et al, "Antireflection effects at nanostructured material interfaces and the suppression of thin-film interference", May 2013, Nanotechnology 24(23):235202, DOI:10.1088/0957-4484/24/23/235202, 8 pages.

"Optimized Moth-eye anti-reflective structures for As_2S_3 chalcogenide optical fibers", 1 page.

Stavroulakis et al, "Suppression of backscattered diffraction from sub-wavelength 'moth-eye' arrays", Jan. 2013, Optics Express 21(1):1-11, DOI:10.1364/OE.21.000001, 12 pages.

De Kraats et al, "Directional and nondirectional spectral reflection from the human fovea", Journal of Biomedical Potics13(2), 024010 (Mar./Apr. 2008), 13 pages.

ICNIRP Guidelines, Published in: Health Physics 74(4):494-522; 1998, 38 pages.

Qiao et al, "A continuous-membrane micro deformable mirror based on anodic bonding of SOI to glass wafer", Microsyst Technol (2010) 16:1765-1769, DOI 10.1007/s00542-010-1102-0, 5 pages.

\* cited by examiner

MIXED REALITY COMBINER

RELATED APPLICATIONS

The present application is a national stage entry of PCT International Application No. PCT/IL2021/050206, filed on Feb. 22, 2021, which claims the benefit under 35 U.S.C. 119(e) of U.S. Provisional Application 62/980,469 filed on Feb. 24, 2020 and U.S. Provisional Application 63/001,567 filed on Mar. 30, 2020. The disclosures of PCT International Application No. PCT/IL2021/050206, U.S. Provisional Application 62/980,469 and U.S. Provisional Application 63/001,567 are incorporated by reference herein.

FIELD

Embodiments of the disclosure relate to an optical waveguide system configured to receive an image from a laser display engine at a relatively small input aperture and deliver the image to exit the waveguide at an expanded output coupling region to fill an enlarged eye motion box for viewing by a user.

BACKGROUND

The proliferating head mounted displays (HMDs) and smart eyeware that are used to provide a user with any of the various new flavors of reality—augmented reality (AR), mixed reality (MR), parallel reality—superpose computer generated "virtual images" on "real images" that the user sees of a real environment in the user's field of view (FOV). The virtual images may by way of example provide the user with entertainment and/or informational material related to the real images, a task performed by the user, and/or an explicit or implicit user request. An image presented to a user comprising a real and a virtual image may be referred to as an extended reality (XR) image and any of various hardware configured to provide a user with an XR image may be referred to generically as an XR display.

In an optical system of an XR display a computer controlled display engine, such as a liquid crystal on silicon (LCos), organic light emitting diode (OLED) or laser beam scanning (LBS) microdisplay, provides the virtual images. An optical element referred to as a combiner, which is transparent to ambient light and through which the user views the real environment, receives and superposes the virtual images provided by the display engine on the real images to provide the user with XR images.

Typically, the virtual images provided by the display engine are relatively small having a characteristic dimension of less than or equal to about 5 mm. The combiner receives the small virtual images at a relatively small input aperture and propagates the images to an output coupler that outputs the virtual images through an exit aperture of the combiner and into an eye motion box (EMB). When the user's eye is positioned in the EMB, the virtual images pass through the user's aperture and onto the user's retina to appear in the XR images as features of the real images which the user sees through the combiner. To fill the EMB so that the user can comfortably see the virtual images without unduly bothering to align the eye with the combiner, the combiner is generally configured having a relatively large, expanded aperture through which the combiner transmits many duplicates of the virtual images into the EMB.

An optical system of a practical XR display is generally required to satisfy a complex mix of ergonomic, technical, and financial constraints. The optical system is advantageously configured to have a comfortably large EMB, be advantageously small, lightweight, and energy efficient, and provide clear virtual images absent overly obtrusive artifacts such as image ghosts.

SUMMARY

An aspect of an embodiment of the disclosure relates to providing an optical waveguide combiner having an output coupler comprising an array of embedded dielectric partially reflective mirrors, hereinafter also referred to as facets, for expanding and coupling a virtual, optionally color, image generated by a laser display engine into a user EMB. For light in a wavelength band provided by a laser that the engine uses to generate the virtual image, the facets are configured to reflect with relatively large reflectivity incident light in a first range of incident angles into the user EMB. In a second range of incident angles different from the first range, the facets are configured to have relatively low reflectivity and transmit light in substantially the same laser wavelength band with relatively large transmittance. The transmittance and reflectivity exhibit relatively small variability in the first and second angular ranges and over a range of wavelengths spanned by the laser wavelength band. The facets are formed having substantially achromatic transmission for visible light, also referred to as natural light, from the environment. Optionally, the display engine comprises at least one laser that provides the display engine with light in red, green, and blue (RGB) bandwidths and processes the light to generate virtual RGB color images. In an embodiment the combiner introduces the color virtual images into the EMB with relatively high RGB image resolution and relatively low adulteration by image artifacts.

In an embodiment, the waveguide combiner comprises a waveguide having first and second parallel, total internal reflecting (TIR) surfaces. Light from the display engine enters the waveguide and is repeatedly reflected from and bounced back and forth between the TIR surfaces to propagate along the waveguide in a reduced, waveguide FOV (wFOV) to reach and be incident on the facets. In an embodiment the facets are evenly spaced and parallel and are tilted at a tilt angle as measured between a normal to the TIR surfaces and a normal to the facets. A component of a light ray in the wFOV that is parallel to the TIR normal reverses direction each time the light ray bounces off the first TIR surface and each time the light bounces off the second TIR surface. Light rays in the wFOV that have undergone an even or an odd number of bounces (as counted from an arbitrary first bounce) before being incident on a given facet, are incident on the given facet at an angle of incidence in the first or second range of angles of incidence respectively. In accordance with an embodiment of the disclosure light rays incident on facets in only one of the first and second ranges of incident angles are selected for coupling out from the waveguide and into the EMB to provide the user with virtual images generated by the display engine.

For convenience of presentation, the range of incidence angles from which light rays in the wFOV are selected to provide the virtual images may be referred to as an "image incidence range". The wFOV, when oriented by TIR reflection in the waveguide to comprise light rays propagating in angular directions within the image incidence range may be referred to as an "image wFOV". The non-selected range of incidence angles may be referred to as a "conjugate incidence range" and the wFOV, when oriented by TIR reflection in the waveguide to comprise light rays propagating in angular directions in the conjugate incidence range may be referred to as a "conjugate wFOV".

In accordance with an embodiment, the tilt angle of the facets is determined to provide an advantageous angular separation between the image incidence range and the conjugate incidence range. The facets are configured having a reflectivity angular range, a transmittance angular range and a facet wavelength band. For light having a wavelength in the facet wavelength band that is incident on the facets at an incident angle in the reflectivity angular range, the facets exhibit relatively high reflectivity and relatively low variance with change in wavelength and incident angle. Similarly, for light having a wavelength in the facet wavelength band that is incident on the facets at an incident angle in the transmittance angular range, the facets exhibit relatively low reflectivity and corresponding high transmittance, and relatively low variance with change in wavelength and incident angle. The facet wavelength band spans a range of wavelengths that includes a lasing bandwidth of the laser that provides light that the display engine processes to generate virtual images and a range of wavelengths over which the lasing bandwidth may vary as a result, for example, of drift due to operating conditions and/or manufacturing tolerances.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter

BRIEF DESCRIPTION OF FIGURES

Non-limiting examples of embodiments of the disclosure are described below with reference to figures attached hereto that are listed following this paragraph. Identical features that appear in more than one figure may be labeled with a same label in multiple figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1A:
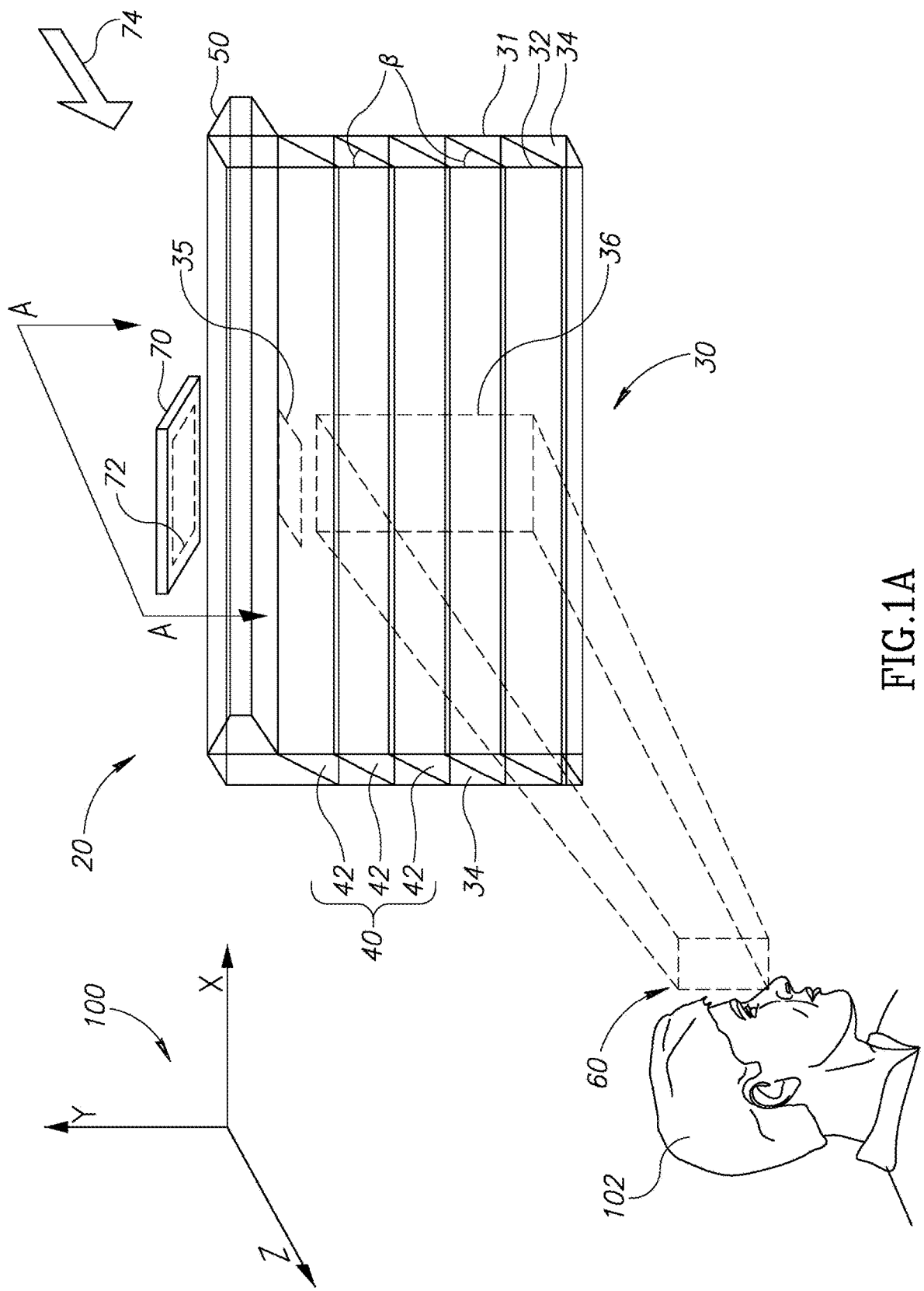
FIG. 1A schematically shows a waveguide combiner comprising a waveguide having an output coupler comprising an array of facets that expands an input aperture of the combiner in one direction to provide an expanded output through which the combiner transmits virtual images received through the input aperture into an EMB, in accordance with an embodiment of the disclosure.

FIG. 1A schematically shows a waveguide combiner 20 optionally comprising a waveguide 30 having two relatively large, parallel face surfaces 31 and 32, edge surfaces 34, and an output coupler 40 comprising an array of parallel, optionally equally spaced facets 42 embedded in the waveguide, in accordance with an embodiment of the disclosure. For convenience of presentation, position of features of waveguide combiner 20 may be referenced with respect to x, y, and z axes of a Cartesian coordinate system 100.

Face surfaces 31 and 32, also referred to as total internal reflecting (TIR) surfaces 31 and 32, are assumed parallel, arbitrarily, to the xy-plane of coordinate system 100. Facets 42 are parallel to and rotated about the x-axis by a tilt angle β in the counterclockwise direction as seen looking along the x-axis towards the yz-plane. An input aperture, schematically represented by a dashed rectangle 35 of waveguide 30, is optionally parallel to the xz-plane and an output coupling region of the waveguide, schematically represented by a dashed rectangle 36, is optionally located on face surface 32. Optionally, waveguide combiner 20 comprises a prismatic input coupler 50 for coupling light from virtual images generated by a display engine 70 into waveguide 30 via input aperture 35. Output coupler 40 operates to expand input aperture 35 in the y-direction and reflect light from virtual images received through input aperture 35 and propagated in waveguide 30 to the output coupler into an EMB 60 via expanded output coupling region 36 for viewing by a user 102, in accordance with an embodiment of the disclosure. In figures that follow user 102 may be represented only by the user's eye. By way of example, in FIG. 1 waveguide combiner 20 is shown generating a virtual image schematically represented by a dashed rectangle 72. Natural light from an environment that user 102 sees through waveguide 30 is schematically represented by a block arrow 74.

Figure 1B:
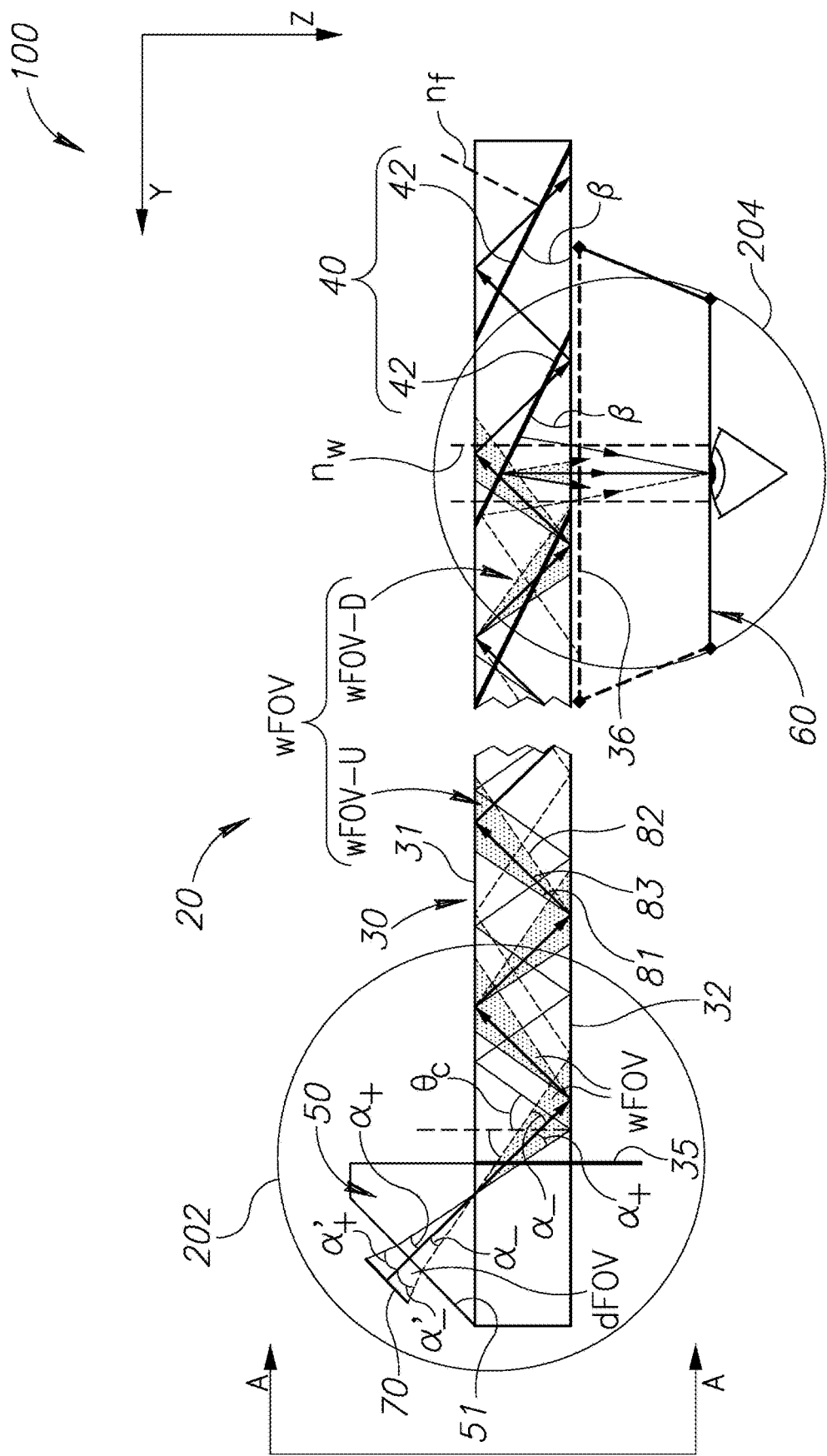
FIG. 1B schematically shows a cross section of the combiner shown in FIG. 1A reflecting light from a laser display engine into a user EMB, in accordance with an embodiment of the disclosure.

FIG. 1B shows a schematic cross section of waveguide combiner 20 along a plane A-A indicated in FIG. 1A and propagation of light from virtual image 72 in waveguide 30 for a wFOV supported by the combiner, in accordance with an embodiment of the disclosure.

FIG. 1B schematically shows light from virtual image 72 (FIG. 1A) in a dFOV of display engine 70 illuminating a face surface 51 of input coupler 50, which couples the light into waveguide 30 via input aperture 35, in accordance with an embodiment of the disclosure. Input coupler 50, input aperture 35 and a portion of waveguide 30 located in a circle 202 are shown enlarged for ease of viewing and reference in FIG. 1C. In a plane A-A dFOV is defined by positive and negative angles $\alpha'_+$ and $\alpha'_-$ respectively, which define an angular extent $\Phi'=(\alpha'_+-\alpha'_-)=(|\alpha'_+|+|\alpha'_-|)$ of dFOV. Angles $\alpha'_+$ and $\alpha'_-$ are angles that light rays 81 and 82 (FIG. 1C) that bound the angular extent of dFOV make with a chief ray represented by an arrow 83 of the dFOV. Light rays 81 and 82 and their respective reflections and refractions in waveguide combiner 20 are represented by solid and dashed lines respectively and may be referred to as positive and negative bounding light rays.

Relative to chief ray 83, an angle of a light ray from virtual image 72 (FIG. 1A) in plane A-A is considered to be positive or negative if the light ray is rotated respectively clockwise or counterclockwise relative to the chief ray in FIG. 1B and figures that follow. Chief ray 83 is assumed to be perpendicular to a face surface 51 of input coupler 50 and indices of refraction relative to air of material from which the input coupler and waveguide 30 are made are assumed to be equal to a same index of refraction $n_g$.

Figure 1C:
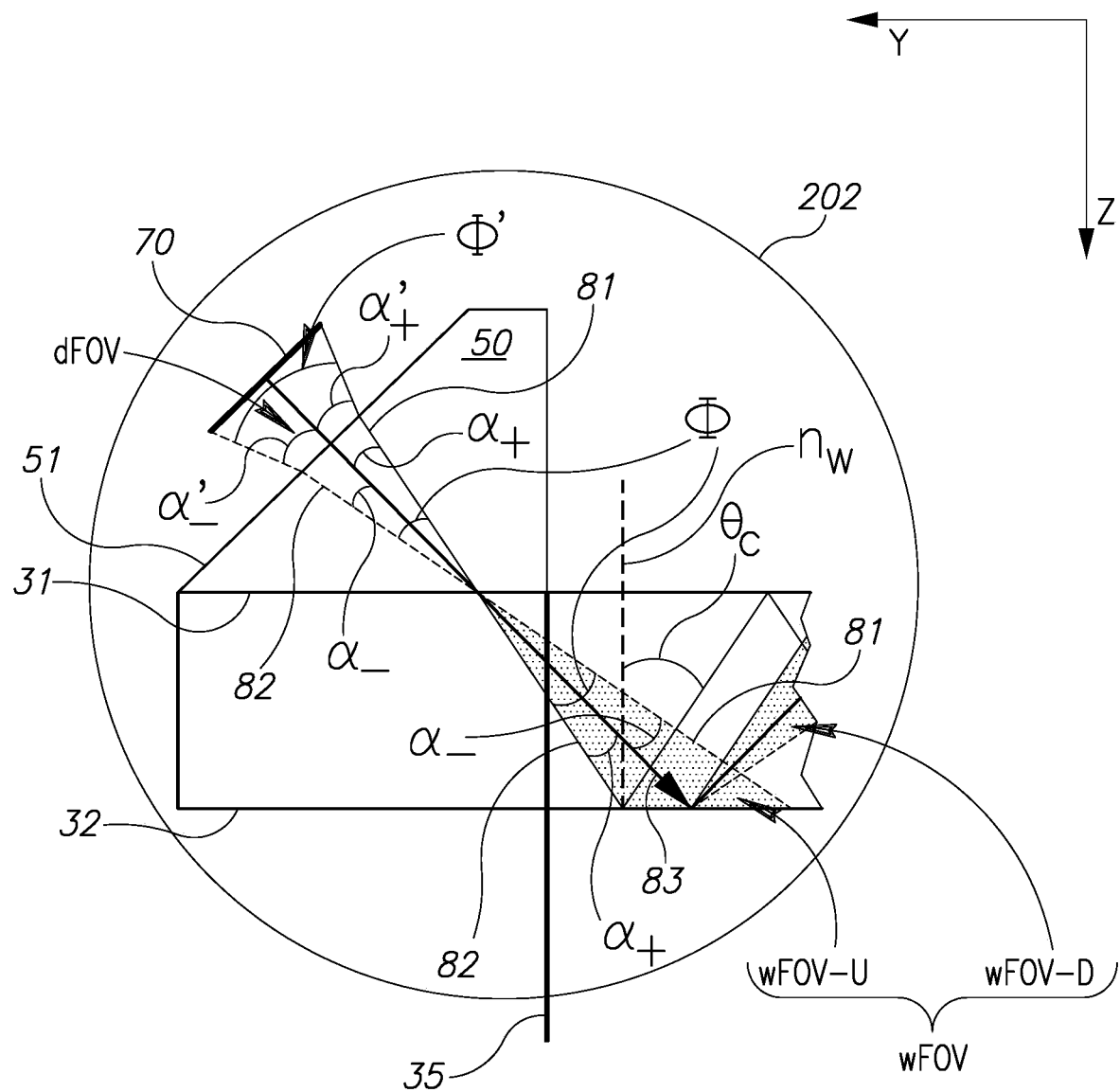
FIG. 1C schematically shows an enlarged portion of the combiner shown in FIG. 1B at which light from the laser display engine enters the combiner, in accordance with an embodiment of the disclosure.

Upon entry into input coupler 50, as more clearly shown by a region 202 of the input coupler enlarged in FIG. 1C, refraction of light reduces angles $\alpha'_+$ and $\alpha'_-$ and the concomitant angular extent $\Phi'$ of dFOV by a factor that is a function of the index of refraction $n_g$. In waveguide combiner 20 reduced angles corresponding to $\alpha'_+$ and $\alpha'_-$ are represented by $\alpha_+$ and $\alpha_-$ respectively, and a reduced angular extent that characterizes field of view wFOV of light from display engine 70 after entry into waveguide combiner 20 is represented by $\Phi$. Angles $\alpha_+$ and $\alpha_-$ are angles that bounding light rays 81 and 82 make with chief light ray 83 in waveguide 30 after refraction and entry into input coupler 50. The bounding light rays delimit wFOV in waveguide combiner 20 and the angles define an angular extent $\Phi=(|\alpha_+|+|\alpha_-|)$ of wFOV. Field of view wFOV is shown shaded in FIGS. 1B and 1C and figures that follow.

It is noted that $\alpha'_+$ and $\alpha'_-$ are defined as positive and negative angles respectively, and upon entry into input coupler 50 corresponding angles $\alpha_+$ and $\alpha_-$ are also defined as positive and negative angles respectively. However with each reflection off a TIR surface 31 or 32 bounding rays 81 and 82 reverse their respective rotations relative to chief light ray 83. As a result, in accordance with the adopted convention that clockwise rotations are positive and counterclockwise rotations are negative, bounding rays 81 and 82 are rotated clockwise relative to chief ray 83 by angles $\alpha_+$ and $\alpha_-$ respectively after reflection from face surface 31. However, after reflection from TIR face surface 32 bounding rays 81 and 82 are rotated respectively counterclockwise relative to chief ray 83 by angles $-\alpha_+$ and $-\alpha_-$.

In waveguide 30, as schematically shown in FIG. 1B, light rays in wFOV are totally reflected by and bounced back and forth between TIR face surfaces 31 and 32 until they reach and are incident on facets 42 of output coupler 40. At each bounce, a component (not shown) of a light ray in wFOV along a normal "$n_w$", to the waveguide reverses direction. As a result, light rays in wFOV after being reflected and bounced off face surface 31 have z-components in the positive z-direction and may be considered as "downward" light rays in the figure propagating downwards from face surface 31 towards face surface 32. When containing downward light rays wFOV is oriented facing downwards, in a positive z-direction. Similarly, light rays after being reflected and bounced off face surface 32 have z-components in the negative z-direction and may be considered as "upward" light rays propagating upwards from face surface 32 towards face surface 31. When facing downwards, wFOV may be distinguished and referenced as wFOV-Down and is labeled in FIG. 1B and figures that follow as wFOV-D. Similarly, when facing upwards, wFOV may be distinguished and referenced as wFOV-Up and is labeled in FIG. 1B and figures that follow as wFOV-U. The label "wFOV" references wFOV-U and wFOV-D generically.

Upon reaching output coupler 40, upward light rays in wFOV-U are incident on facets 42 in a first range, hereinafter also referred to as an Up-Range, of incident angles relative to a normal, "$n_f$", to the facets and downward light rays in wFOV-D are incident in a second range, also referred to as a Down-Range, of incident angles on the facets. In accordance with an embodiment of the disclosure light rays in one of wFOV-U or wFOV-D are selected to be reflected out of waveguide 30 by facets 42 through output coupling region 36 and into EMB 60 for user viewing of virtual images, such as virtual image 72 (FIG. 1A), generated by display engine 70. For light rays in the selected wFOV-U or wFOV-D, facets 42 are configured to have relatively enhanced reflectivity for the corresponding Up-Range or Down-Range incident angles. For light waves in the non-selected wFOV, facets 42 are configured to have relatively enhanced transmittance. The selected wFOV may be referred to as an image wFOV, and the non-selected wFOV may be referred to as a conjugate wFOV.

By way of example, in waveguide 30 facets 42 are oriented at a relatively small tilt angle $\beta$ and light rays in wFOV-U and wFOV-D are incident on the facets from opposite sides of the facets. In accordance with an embodiment of the disclosure, wFOV-U is selected as an image wFOV and light rays in wFOV-U are selected to be reflected out of waveguide 30 through output coupling region 36 to provide an output field of view, O-FOV, in EMB 60 for viewing of virtual images generated by display engine 70. For convenience of presentation and reference, a region of FIG. 1B indicated by a circle 204 is shown enlarged in FIG. 1D.

Figure 1D:
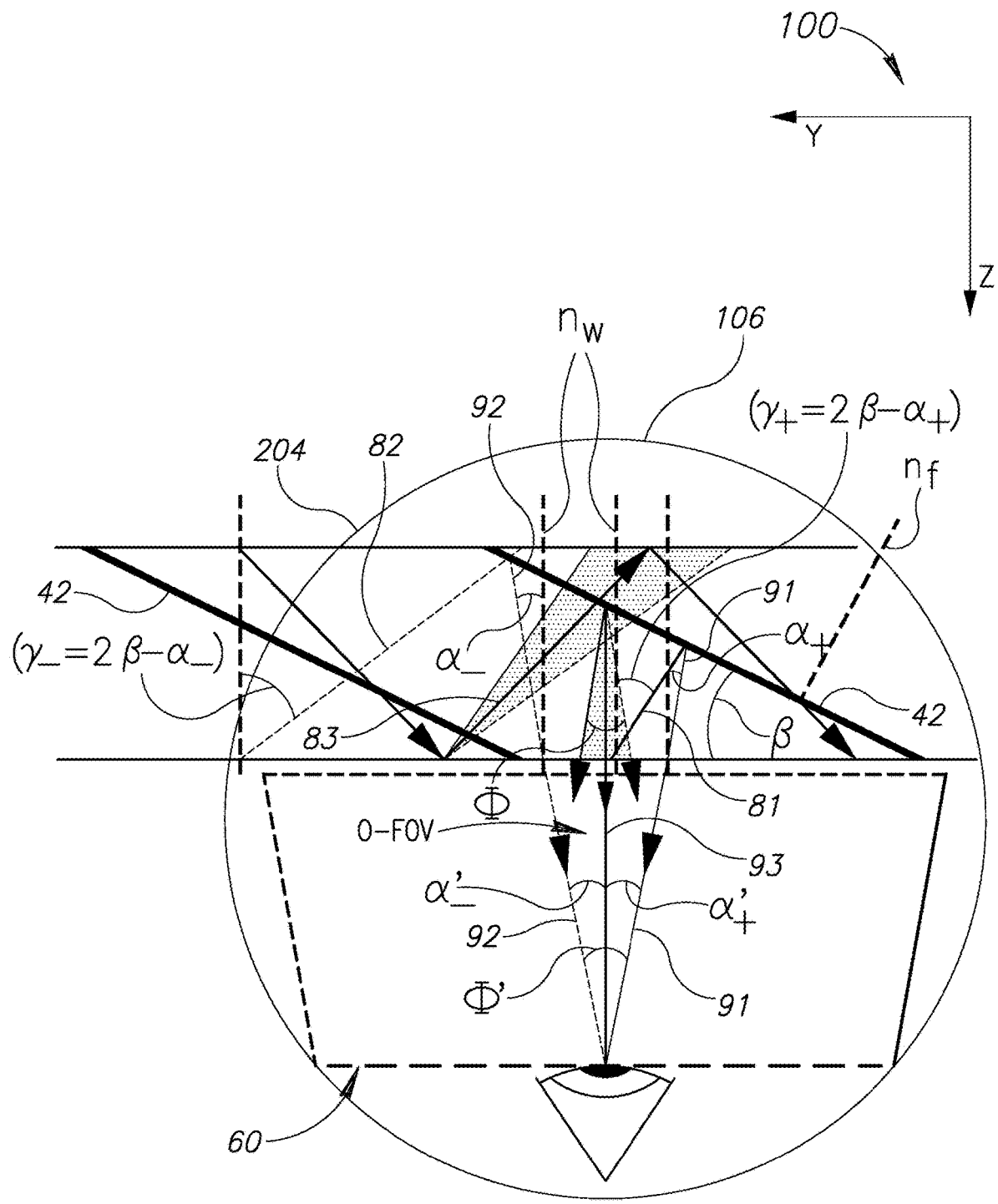
FIG. 1D schematically shows an enlarged portion of the combiner shown in FIG. 1B at which light from the laser display engine exits the combiner into the EMB, in accordance with an embodiment of the disclosure.

The enlarged region 204 in FIG. 1D shows an enlarged portion of waveguide 30 comprising facets 42, EMB 60, and O-FOV as seen by user 102, and angles relevant to an embodiment of the disclosure and virtual images such as virtual image 72 provided by display engine 70 that the user sees. The figure schematically shows light from upward directed positive and negative bounding light rays 81 and 82 reflected by a given facet 42 in output coupler 40 (FIG. 2A) into EMB 60 as positive and negative bounding output light rays 91 and 92. Light rays 91 and 92 delimit output field of view, O-FOV, seen by user 102. By way of example O-FOV is assumed to have a same angular extent $\Phi'$ as field of view dFOV (FIG. 1C), which comprises light received by prism input coupler 50 that is introduced by the input coupler into waveguide 30 via input aperture 35. Bounding output rays 91 and 92 in waveguide 30 make angles $\alpha_+$ and $\alpha_-$ respectively with an output chief ray 93 of O-FOV that is reflected by facet 42 from chief ray 83. Optionally, output rays 91 and 92 also make angles $\alpha_+$ and $\alpha_-$ with normal $n_w$ of face surfaces 31 and 32. Bounding output rays 91 and 92 are refracted upon entry into EMB 60 to make angles $\alpha'_+$ and $\alpha'_-$ respectively with light in output chief ray 93.

Negative bounding light ray 82 that is incident on facet 42 and from which the facet reflects light into negative bounding output ray 92 makes an angle $\gamma_-$ with respect to normal $n_w$. Similarly, positive bounding light ray 81 that is incident on facet 42 and from which the facet reflects light into positive bounding output ray 91 makes an angle $\gamma_+$ with respect to normal $n_w$. Angles $\gamma_-$ and $\gamma_+$ are functions of tilt angle $\beta$ and of angles $\alpha_-$ and $\alpha_+$ respectively, and may be written:

$$\gamma_- = (2\beta \div \alpha_-); \qquad 1)$$

and $$\gamma_+ = (2\beta - \alpha_+), \qquad 2)$$

where it is noted that by definition "counterclockwise" angle $\alpha_-$ has a negative value and "clockwise" angle $\alpha_+$ has a positive value. The relationships provided by expressions 1) and 2) are valid for any light ray in wFOV and if $\alpha$ represents an angle that any light ray in wFOV makes with chief light ray 83 then for any $\alpha$ the angle $\gamma$ may be written, $$\gamma = (2\beta \div \alpha). \qquad 2)$$

A light ray in wFOV-U is therefore incident on a facet 42 at an incident angle $\phi_u$ relative to a normal $n_f$ to the facet given by an expression, $$\phi_u = (\gamma - \beta) = (\beta - \alpha), \qquad 4)$$

and an associated Up-Range, of incident angles selected as an image incidence range includes all incident angles between $(\beta - \alpha_+)$ and $(\beta - \alpha_-)$ and may be given by an expression, $$\text{Up-Range} = \{\forall \phi_u | (\beta - \alpha_+) \leq \phi_u \leq (\beta - \alpha_-)\}. \qquad 5)$$

Similarly, a light ray in wFOV-D is incident on the facet at an incident angle $\phi_d$ relative to normal $n_j$ that may be given by an expression, $$\phi_d = (\gamma + \beta) = (3 = -\alpha), \qquad 6)$$

and an associated Down-Range, selected as a conjugate incidence range, may be written, $$\text{Down-Range} = \{\forall \phi_d | (3\beta - \alpha_+) \leq \phi_d \leq (3\beta \div \alpha_-)\}. \qquad 7)$$

In accordance with an embodiment of the disclosure to moderate appearance of artifacts associated with virtual images in EMB 60 it is advantageous that all rays in wFOV-U be incident on a same side of facets 42 and that all rays in wFOV-D be incident on a same side of facets 42. The side on which rays in wFOV-U are incident on facets 42 may in accordance with an embodiment be a same or different side of the facets on which light rays in wFOV-D are incident on the facets.

By way of example, waveguide combiner 20 and field of view wFOV are configured so that all the light rays in wFOV-U are incident on a side of facets 42 that faces towards face surface 32, and all the light rays in wFOV-D are incident on the opposite sides of the facets, that is the sides facing face surface 31. To provide for the incidence on opposite sides, waveguide combiner 20 is configured so that for any light ray in wFOV that the waveguide combiner supports, the complement of $\gamma$ is greater than the tilt angle $\beta$ of facets 42. In symbols, $$(90 - \gamma) > \beta, \qquad 8)$$

which upon substituting for $\gamma$ and noting that $\alpha_+ > \alpha_-$ requires that tilt angle $\beta$ in combiner 20 satisfy a first constraint in accordance with an embodiment of the disclosure given by an expression $$\beta < (30° + \alpha_-/3). \qquad 9)$$

To provide for total internal reflection of light in wFOV from face surfaces 31 and 32 requires that for any light ray in wFOV, angle $\gamma$ be greater than a critical angle $\theta_C$ of waveguide 30, which leads to a second constraint that tilt angle $\beta$ in combiner 20 satisfy:

$$\gamma_+ = (2\beta - \alpha_+) > \theta_C \Rightarrow \beta > (\theta_C + \alpha_+)/2. \qquad 10)$$

The constraints given by expressions 9) and 10) may be combined to a single expression that provides limits to tilt angle $\beta$ for combiner 20, $$(\theta_C + \alpha_+)/2 < \beta < (30° + \alpha_-/3). \qquad 11)$$

Assuming by way of example that $|\alpha_+| = \alpha_- | = \Phi/2$, then the constraints on tilt angle $\beta$ in combiner 20 may be expressed as a function of field of view wFOV, $$(\theta_C \Phi/2)/2 < \beta < (30° + \Phi/6). \qquad 12)$$

In terms of the angular extent $\Phi'$ of output field of view O-FOV that user 102 sees in EMB 60, the constraint on $\beta$ may be approximated by expression 11)

$$(\theta_C + \Phi'/2n_g)/2 < \beta < (30° + \Phi'/6n_g), \qquad 13)$$

where $n_g$ is the index of refraction of material from which waveguide combiner 20 is formed.

By way of a numerical example, assume that $n_g$ is equal to 1.51 for green light having wavelength of about 550 nm, that the absolute values $|\alpha_+|$ and $|\alpha_-|$ are both equal to about 13°, and that $\Phi'$ has a diagonal extent of about 30° and an aspect ratio of 16:9. For $\beta$ equal to about 26°, the Up-Range, reflectivity angular range of incident angles advantageously extends from about 17°-35° and the Down-Range transmittance angular range extends advantageously from about 66°- to about 84°. Advantageously, reflectivity for light rays in the Up-Range is between about 9% and about 11% and is optionally greater than about 10% and reflectivity for light rays in the Down-Range is less than about 1.5% and is optionally less than about 1%. An angular "See-Thru" range for environmental, natural light 74 (FIG. 1A) incident on the facets advantageously extends from about 5° to about 45° and exhibits substantially achromatic transmittance greater than or equal to about 85%.

Figure 1E:
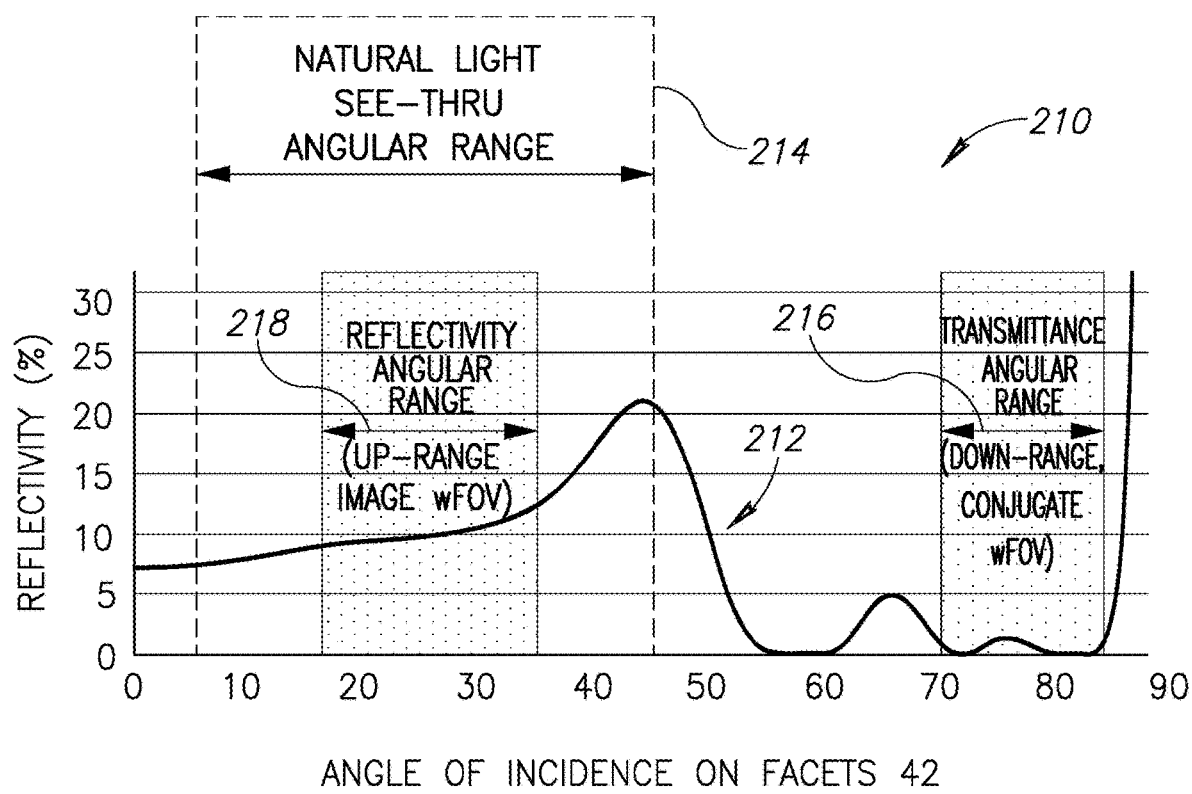
FIG. 1E shows a schematic graph of reflectivity as a function of angle of incidence of light from the laser display engine on the facets shown in FIGS. 1A and 1C and reflectivity of the facets for natural light, in accordance with an embodiment of the disclosure.

FIG. 1E shows a graph 210 of reflectivity for facets 42 that may be manufactured to substantially accord with the numerical specifications discussed above. The graph comprises a reflectivity curve 212 that gives reflectivity of facets 42 in waveguide 30 as a function of incident angle of light on the facets. Reflectivity in percent is shown along an ordinate of graph 210, and angle of incidence of light on facets 42 is shown along the abscissa. The Up-Range of incident angles selected to be the image wFOV and reflectivity angular range is schematically represented by a shaded region 218. The Down-Range of incident angles selected to be the transmittance angular range and conjugate wFOV is schematically represented by a shaded region 216. A dashed hat function 214 indicates the "See-Thru", angular range of the facets for natural light 74 (FIG. 1A), in accordance with an embodiment of the disclosure.

Assuming that display engine 70 comprises laser diodes (LD) that provide R, G, and B light, which the display engine processes to produce virtual images, facets 42 are designed so that reflectivity of the facets is relatively constant as a functions of wavelength for the Up-Range and Down-Range of incident angles for each R, G, B lasing bandwidth at which the LDs are expected to lase. Optionally, variance of reflectivity of the facets with wavelength in respective R, G, and B facet wavelength bands is less than 5%. In an embodiment the variance is less than 2%.

LDs typically lase at wavelengths in a relatively narrow wavelength band of between 1-2 nm (nanometers) FWHM (full width half max). However a LD lasing bandwidth may shift for example, by as much as 0.1 nm to 0.35 nm per degree Celsius (° C.) change in LD operating temperature, and operating temperatures may easily change by as much as 20° C. Furthermore, manufacturing tolerances may allow as much as a 5 nm variance in a central lasing wavelength at which LDs of a same type lase. In accordance with an embodiment, facets 42 are advantageously configured to have a facet wavelength band for each of R, G, and B light produced by the LDs for the Up-Range and Down-Range angles of incidence equal to or greater than about 20 nm. Advantageously, for each facet wavelength band reflectivity for wavelengths in the band varies by less 3% of an average reflectivity to provide a color gamut chromaticity discrepancy radius "ΔCG" in a CIE 1931 xy chromaticity space that is less than or equal to about 0.02.

Figure 1F:
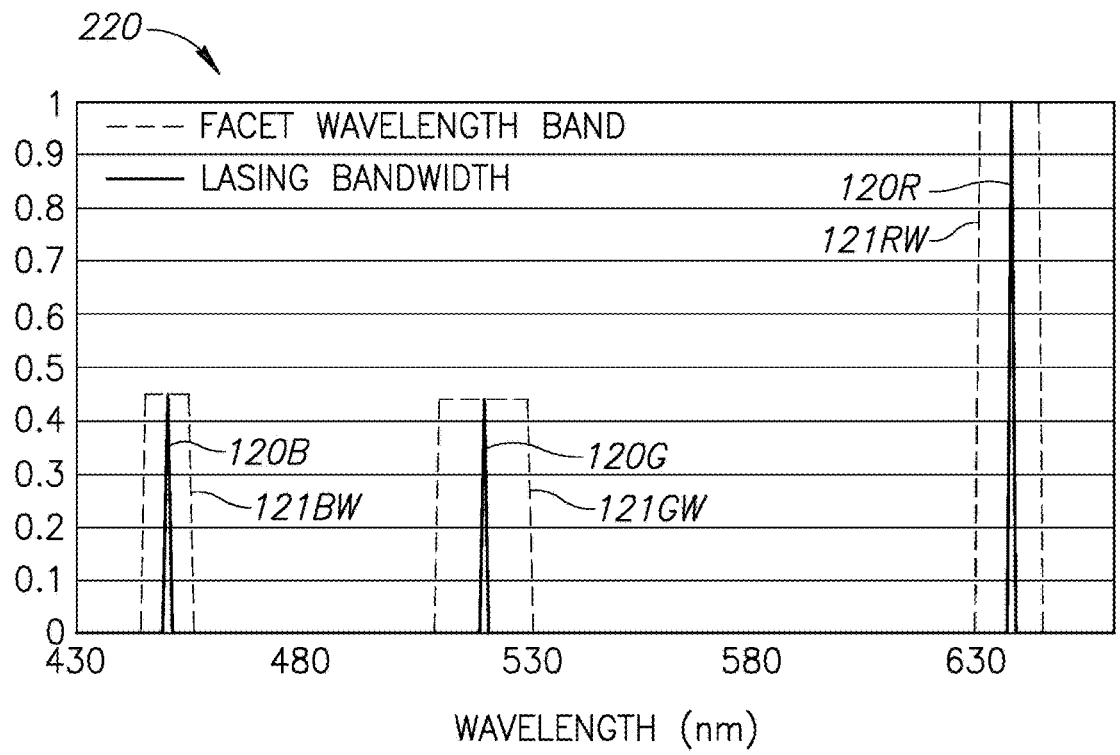
FIG. 1F schematically shows optional lasing bandwidths for lasers in the display engine shown in FIGS. 1A and 1B and matching facet wavelength bands of the facets shown in the figures, in accordance with an embodiment of the disclosure.
Figure 1G:
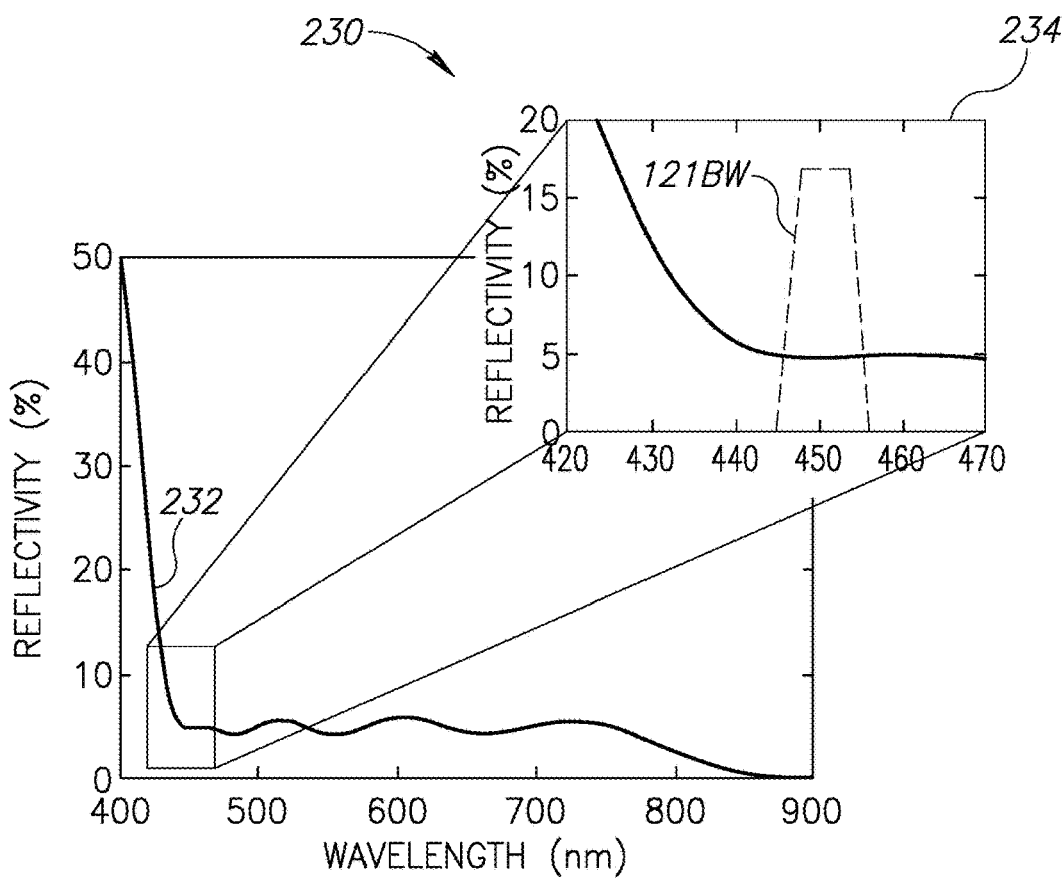
FIG. 1G shows a graph of reflectivity as a function of wavelength for the facets shown in FIGS. 1A and 1B for a facet wavelength band of blue light, in accordance with an embodiment of the disclosure.

By way of example, FIG. 1F schematically shows lasing bandwidths 120R, 120G, and 120B for R, G, and B lasing bandwidths of LDs in display engine 70 and corresponding facet wavelength bands 121RW, 121GW, 121BW, for facets 42, in accordance with an embodiment of the disclosure. FIG. 1G shows a graph 230 of a curve 232 that gives reflectivity of facets 42 as a function of wavelength for a span of blue wavelengths in the visible spectrum. In an inset 234 a portion of curve 232 is magnified in an inset 234 and is marked to show a region of the curve centered at a blue wavelength of about 450 nm between about 445 nm to about 455 nm that graphs reflectivity as a function of wavelength in facet wavelength band 121BW. Reflectivity of facets 42 for wavelengths in facet wavelength band 121BW is equal to about 4.8% and varies for wavelengths in the wavelength band by less than about 5%.

Facets 42 having reflectivity for incident angle See-Thru range, Up-Range, and Down-Range shown in FIG. 1E, and R, G, B facet wavelength bands shown in FIG. 1F may comprise partially reflecting dielectric mirrors. The partially reflecting dielectric mirrors may be manufactured by depositing partially reflecting coatings on surfaces of preformed prisms and bonding the prisms together. The prisms may be fabricated by grinding and polishing a silicate material, such as BK-7, to a desired shape, or by injection molding a suitable polymer or sol-gel. The coatings, may be formed from any of various suitable materials such as by way of example, Hafnium dioxide ($HfO_2$), Magnesium fluoride ($MgF_2$) and/or Tantalum pentoxide ($Ta_2O_5$).

Figure 2A:
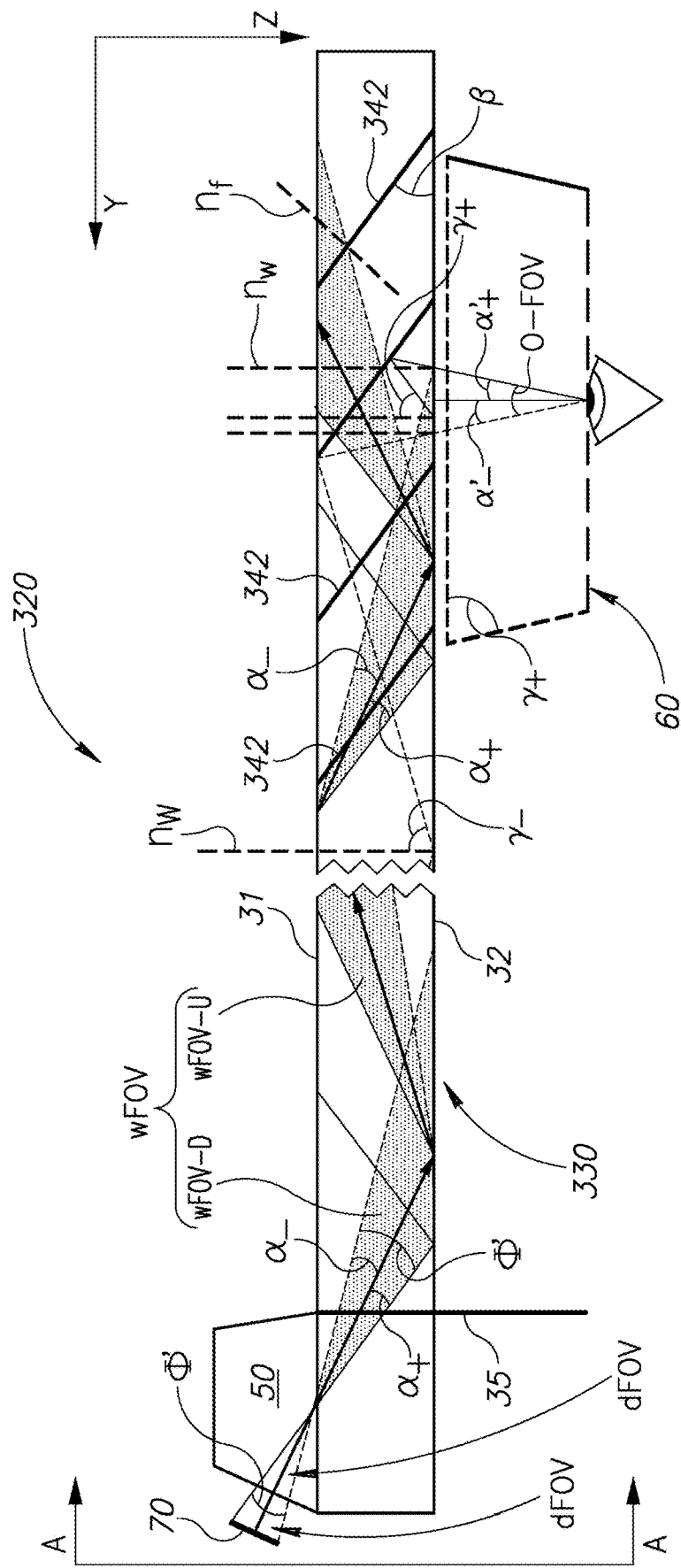
FIG. 2A schematically shows a cross section of a waveguide combiner similar to the combiner shown in FIG. 1A comprising facets tilted at an intermediate tilt angle reflecting light from a laser display engine into a user EMB, in accordance with an embodiment of the disclosure.

FIG. 2A schematically shows another waveguide combiner 320, in accordance with an embodiment of the disclosure. Waveguide combiner 320 is similar to waveguide combiner 20 and has wFOV-U and wFOV-D selected for image wFOV and conjugate wFOV respectively. However waveguide combiner 320 comprises a waveguide 330 having facets 342 that are tilted at a tilt angle β that is larger than the tilt angle of facets 42 in waveguide combiner 20. Furthermore, unlike waveguide combiner 20, waveguide combiner 320 is configured so that light rays in both wFOV-D and wFOV-U are incident on a same side of facets 242, that is the side facing TIR face surface 32.

To provide the same side incidence exhibited by waveguide combiner 320 calculations similar to those performed form waveguide combiner 20 lead to the following constraints for waveguide combiner 320. For all γ, $$\beta > 90 - \gamma \Rightarrow \beta > 30° + \alpha_+/3 \qquad 14)$$

$$\gamma = (2\beta - \alpha_-) < 90° \Rightarrow \beta < (90° + \alpha_-)/2; \qquad 15)$$

$$(30° + \alpha_+/3) < \beta < (45° + \alpha_-/2) \text{ or } (30° + \Phi/6) < \beta < (45° - \Phi/4); \qquad 16)$$

Angular Up-Range and Down-Range for waveguide combiner 32 become, $$\text{Up-Range} = \{\forall \phi_u | (\beta - \alpha_+) \leq \phi_u \leq (\beta - \alpha_-)\}; \qquad 17) \text{ and}$$

$$\text{Down-Range} = \{\forall \phi_d | (180° - 3\beta + \alpha_-) \leq \phi_d \leq (180° - 3\beta + \alpha_+)\}, \qquad 18)$$

where $\phi_u$ and $\phi_d$ are incident angles for light waves in wFOV-U and wFOV-D, respectively.

By way of a numerical example for waveguide 330 for $n_g$ equal to about 1.5 for a wavelength of about 550 nm, the absolute values $|\alpha_+|$ and $|\alpha_-|$ equal to about 13°, and $\Phi'$ having a diagonal extent of about 30° and an aspect ratio of 16:9, β may equal about 35°. The Up-Range, reflectivity angular range, of incident angles selected as the image wFOV advantageously extends from about 26° to about 44° and is characterized by an average reflectivity optionally between about 9% and 11%, optionally equal to or greater than 10%. The Down-Range, transmittance angular range, selected for the conjugate wFOV extends advantageously from about 66° to about 84° and is characterized by an average reflectivity less than or equal to about 5%, and optionally equal to or less than 2%. A See-Thru range advantageously extends from about 15° to about 55° and is characterized by a transmittance equal to or greater than about 85%.

Figure 2B:
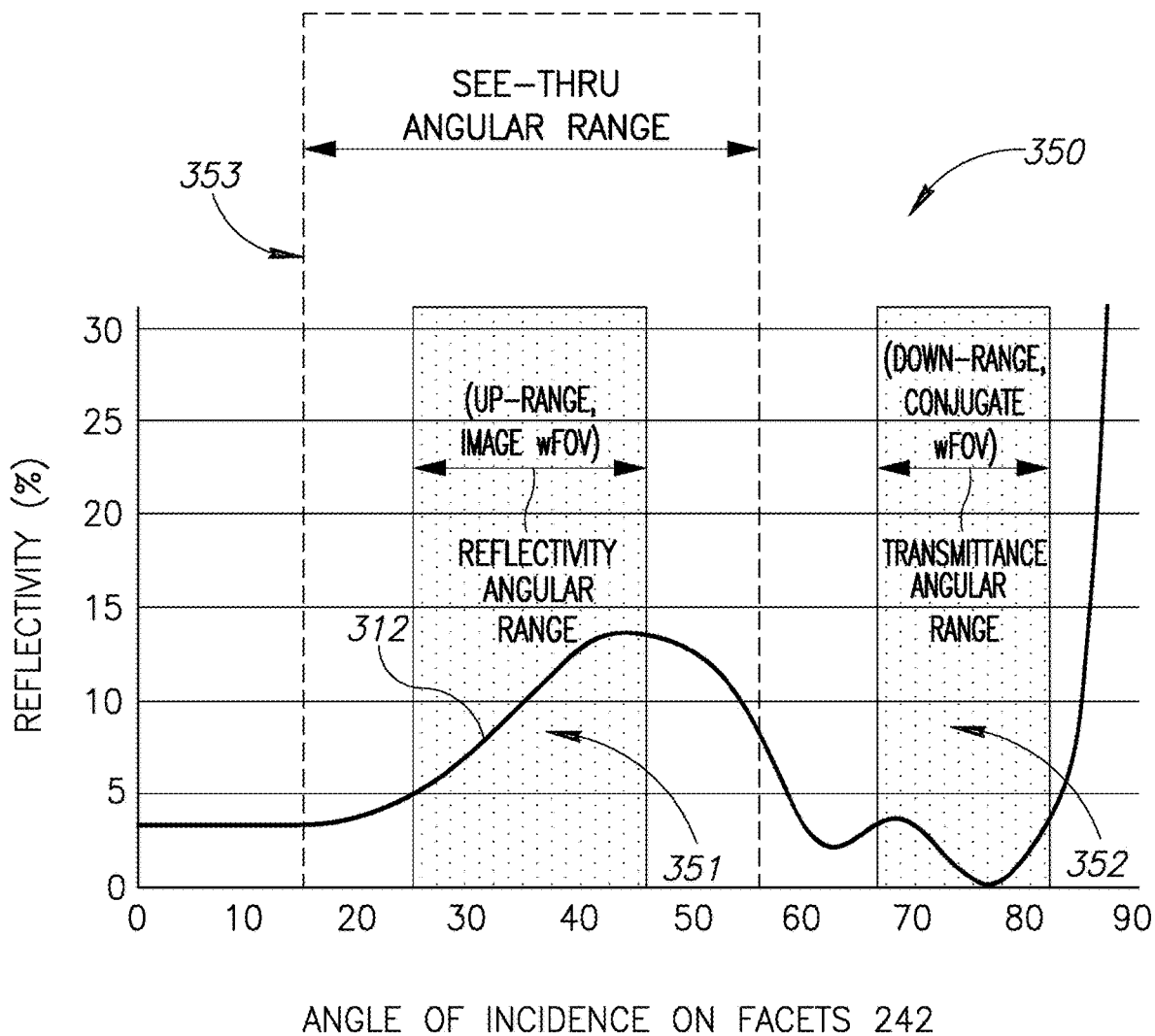
FIG. 2B shows a schematic graph of reflectivity as a function of angle of incidence of light on the facets shown in FIG. 2A, in accordance with an embodiment of the disclosure.

FIG. 2B shows a graph 350 of reflectivity for facets 242 that may be manufactured optionally similarly to the way facets 42 are manufactured, to substantially accord with the numerical specifications discussed above. The graph comprises a reflectivity curve 312 that gives reflectivity of facets 242 in waveguide 330 as a function of incident angle of light on the facets. Reflectivity in percent is shown along an ordinate of graph 351, and angle of incidence of light on facets 242 is shown along the abscissa. The Up-Range of incident angles selected to be the image wFOV and reflectivity angular range is schematically represented by a shaded region 351. The Down-Range of incident angles selected to be the transmittance angular range and conjugate wFOV is schematically represented by a shaded region 352. A dashed hat function 353 indicates the "See-Thru", angular range of the facets for natural light 74 (FIG. 1A), in accordance with an embodiment of the disclosure.

Figure 3A:
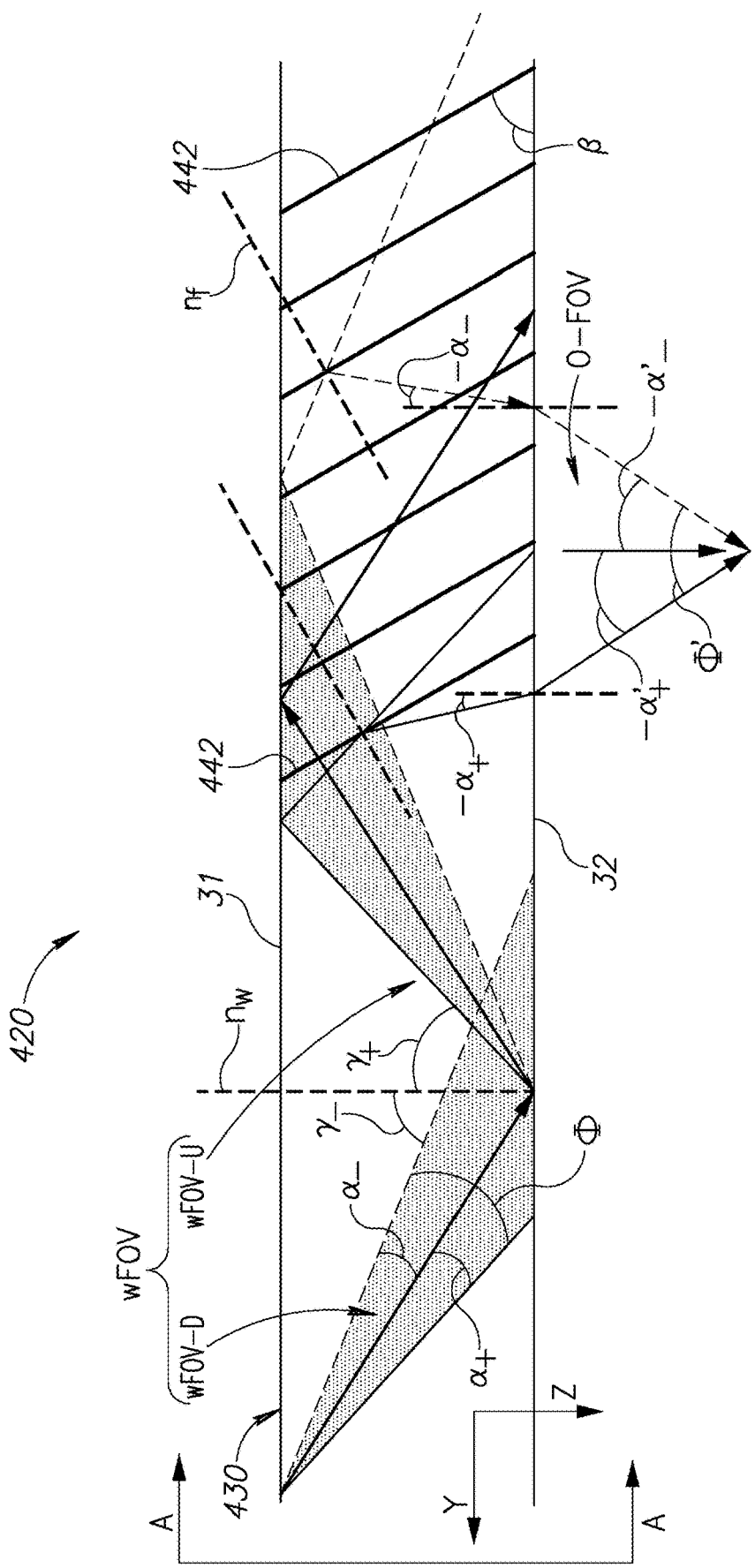
FIG. 3A schematically shows a cross section of a waveguide combiner similar to the combiner shown in FIG. 1A comprising facets tilted at a relatively large tilt angle reflecting light from a laser display engine into a user EMB, in accordance with an embodiment of the disclosure.

FIG. 3A schematically shows another waveguide combiner 420, in accordance with an embodiment of the disclosure. Waveguide combiner 420 is similar to waveguide combiner 320 shown in FIG. 2A but comprises a waveguide 430 having facets 442 that are tilted at a tilt angle β that is larger than the tilt angle of facets 342 in combiner waveguide 330. And whereas waveguide combiner 420 is configured, as is waveguide combiner 320, so that light rays in both wFOV-D and wFOV-U are incident on a same side of facets 342 (the side facing face surface 32), in waveguide combiner 420, unlike in waveguide combiner 320, wFOV-D is the image wFOV and wFOV-U is the conjugate wFOV.

For waveguide combiner 420, $$\gamma_\pm = 180° \div 2\beta - \alpha_\pm, \text{ or } \gamma = 180° - 2\beta - \alpha, \qquad 19)$$

and noting that for combiner 420 $\gamma_- > \gamma_+$, to provide the configuration of waveguide combiner 420 for which wFOV-D rather than wFOV-U is the image wFOV, the following constraints are met:

$$(90° - \gamma_-) > 0 \Rightarrow \qquad 20)$$

$$\beta > 45° - \alpha_-/2, \qquad 21) \text{ and}$$

$$\gamma_+ > \theta_C \Rightarrow \qquad 22)$$

$$\beta < 90° - (\alpha_+ + \theta_C)/2 \qquad 23)$$

Combining expressions 21 and 23 gives the following expression for the constraints on β, $$45° - \alpha_-/2 < \beta < 90° - (\alpha_+ + \theta_C)/2 \qquad 24)$$

The angular Up-Range, which is the transmittance range, and the Down-Range, which is the reflectivity range, for waveguide combiner 420 may be written, $$\text{Up-Range} = \{\forall \phi_u | (180° - 3\beta - \alpha_+) \leq \phi_u \leq (180° - 3\beta - \alpha_-)\}; \qquad 25) \text{ and}$$

$$\text{Down-Range} = \{\forall \phi_d | (\beta + \alpha_-) \leq \phi_d \leq (\beta + \alpha_+)\}. \qquad 26)$$

Figure 3B:
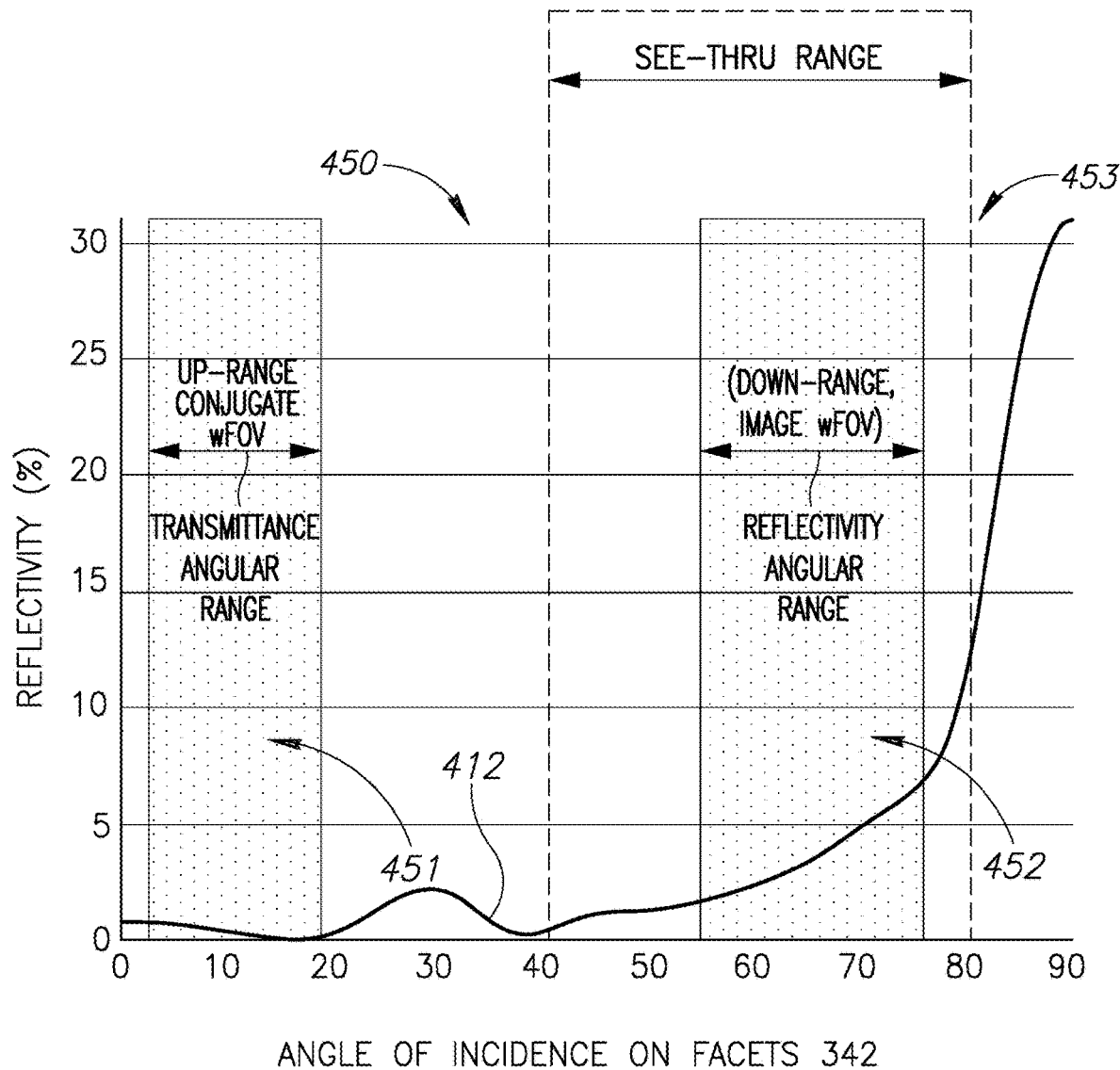
FIG. 3B shows a schematic graph of reflectivity as a function of angle of incidence of light on the facets shown in FIG. 2A, in accordance with an embodiment of the disclosure.

FIG. 3B provides a graph 450 that shows the angular locations and extents of the Up-Range (transmittance range) 451 Down-Range (reflectance range) 452 and See-Thru range 453 for facets 442 in waveguide 430.

By way of a numerical example for waveguide 430, assuming $n_g$ equal to about 1.51 for a wavelength of 550 nm, the absolute values $|\alpha_+|$ and equal to about 13°, and $\Phi'$ having a diagonal extent of about 30° and an aspect ratio of 16:9, β may be equal to 63.5°. The Up-Range, transmittance angular range of incident angles advantageously extends from about 2° to about 20° and has a relatively low average reflectivity advantageously less than about 5% and optionally less than or about equal to 2.0%. The Down-Range, selected for the reflective angular range and image wFOV, advantageously extends from about 55° to about 75° and has a relatively high average reflectivity between about 9% and about 11% and optionally greater than or equal to 10%. A See-Thru range advantageously extends from about 40° to about 80° and is characterized by a transmittance equal to or greater than about 85%.

FIG. 3B shows a graph 450 of reflectivity for facets 342 that may be manufactured optionally similarly to the way facets 42 are manufactured, to substantially accord with the numerical specifications discussed above. The graph comprises a reflectivity curve 412 that gives reflectivity of facets 342 in waveguide 430 as a function of incident angle of light on the facets. Reflectivity in percent is shown along an ordinate of graph 351, and angle of incidence of light on facets 342 is shown along the abscissa. The Up-Range of incident angles selected to be the conjugate wFOV and transmittance angular range is schematically represented by a shaded region 451. The Down-Range of incident angles selected to be the reflectance angular range and image wFOV is schematically represented by a shaded region 452. A dashed hat function 453 indicates the See-Thru, angular range of the facets for natural light 74 (FIG. 1A), in accordance with an embodiment of the disclosure.

More generally, let $v_u$ represent a normalized vector in the propagation direction of an upward light ray that is contained in a wFOV-U in waveguide 30, 330, or 430 of waveguide combiner 20, 320, or 420, but not necessarily in the plane A-A respectively shown for the waveguide combiner in FIG. 1B, 2B, or 3B. Then the incident angle $\phi_u$ of the upward light ray on a facet of the waveguide relative to the normal to the facet may be given by an expression, $$\phi_u = \cos^{-1}(v_u \cdot n_f), \qquad 27)$$

where $n_f$ is the vector normal to the facet. Similarly, if $v_d$ represents a propagation direction of a downward light ray contained in wFOV-D but not necessarily in plane A-A, the angle of incidence $\phi_d$ of the light ray on a facet of the waveguide may be written, $$\phi_d = \cos^{-1}(v_d \cdot n_f) = \cos^{-1}((v_u - 2v_u \cdot n_w) n_f), \qquad 28)$$

where $n_w$ is the vector normal to the TIR face surfaces of the waveguide.

The constraints discussed above with reference to plane A-A on a waveguide combiner in accordance with an embodiment of the disclosure may be generalized as functions of $v_u$ and/or $v_d$. For example, for waveguide combiner 420, equations 24) and 25) may be rewritten, $$\text{Up-Range} = \{\forall \phi_u | (-180° + 3\beta + \alpha_-) \leq \cos^{-1}(v_u \cdot n_f) \leq (-180° + 3\beta + \alpha_+)\}; \qquad 29) \text{ and}$$

$$\text{Down-Range} = \{\forall \phi_u | (\beta - \alpha_-) \leq \cos^{-1}((v_u - 2v_u \cdot n_w) \cdot n_f) \leq (\beta + \alpha_+)\}. \qquad 30)$$

It is noted that in the above discussion it has been assumed that each facet in a combiner waveguide in accordance with an embodiment is designed to have reflectivity and transmittance angular ranges for each of R, G, and B light. However, practice of an embodiment of the disclosure is not limited to facets that have angular ranges for each of R, G, and B light. A facet in accordance with an embodiment may be designed to function for colors different than R, G, and B, and may be configured to function for more or less than three colors. For example each facet may be designed to function for only one, or only two of R, G, or B.

It is also noted that a spacing between facets, referred to as facet pitch "P", which may be defined by an expression P=ηLcosβ, where L is a length of a facet between TIR faces and η is a coefficient, typically less than one, may for example advantageously be different from that shown in FIG. 1B, 2A, or 3A. In FIGS. 1B and 2A, is substantially equal to 1 and pitch P is shown substantially equal to P=Lcosβ. In FIG. 3A is substantially equal to 0.7 and P=0.7 Lcosβ. A smaller pitch P may be advantageous to provide spatial integrity to virtual images provided by a waveguide combiner in accordance with an embodiment.

Waveguide combiners discussed above by way of examples expand input aperture 35 in one direction along the y-axis (as shown for example in FIG. 1A) in accordance with an embodiment of the disclosure. A waveguide combiner that expands an input aperture along two directions, for example the x-direction as well as the y-direction, may be provided by replacing input coupler 50 in the waveguide combiner shown in FIG. 1A with a waveguide combiner that expands an input aperture in the x-direction, in accordance with an embodiment of the disclosure.

Figure 4:
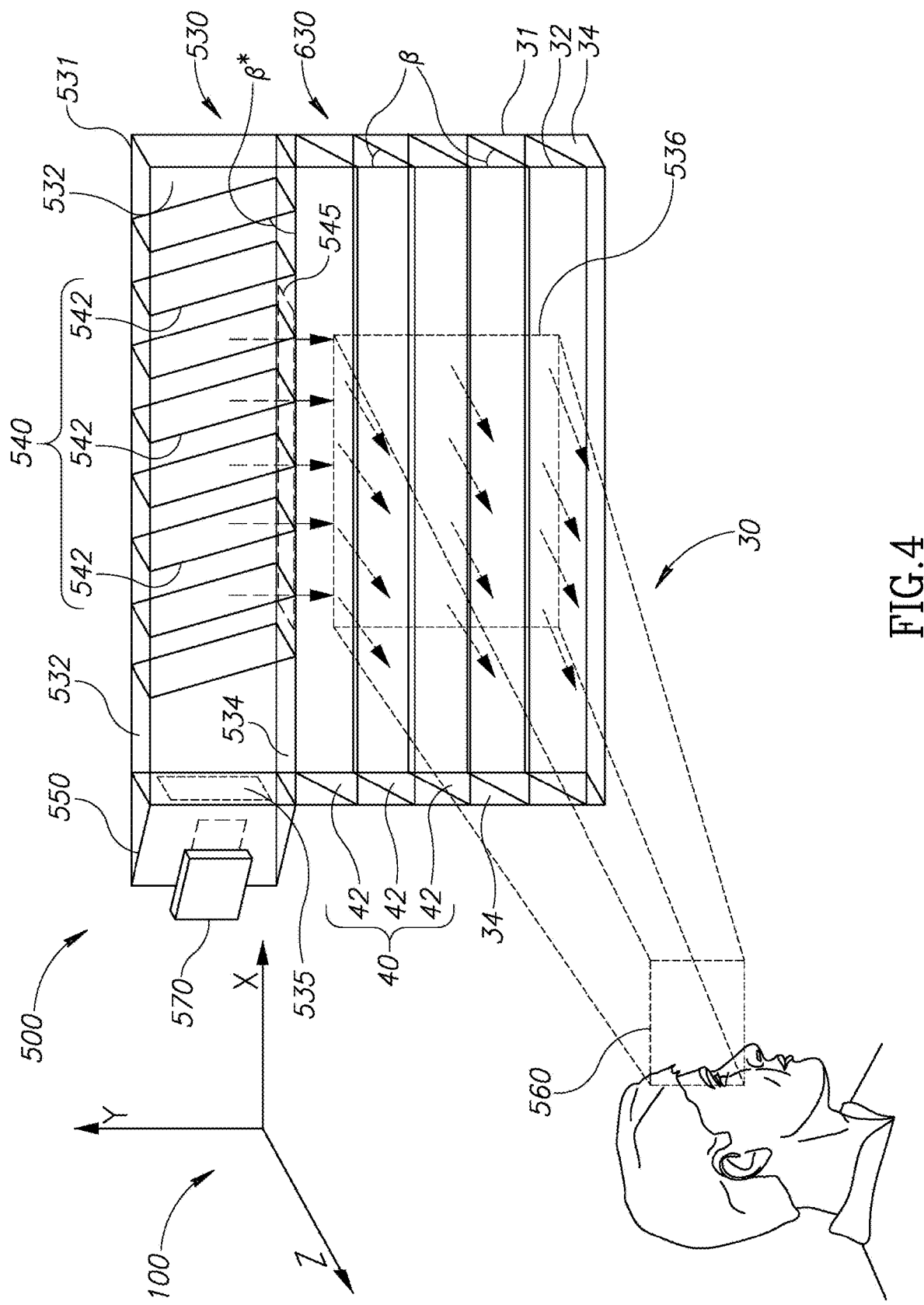
FIG. 4 schematically shows a perspective view of a waveguide combiner comprising a system of waveguides that provides two dimensional aperture expansion, in accordance with an embodiment of the disclosure.

FIG. 4 schematically shows a waveguide combiner 500 that expands an input aperture 535 in two, optionally orthogonal, directions to provide an expanded output coupling region 536 through which the waveguide combiner directs light into an EMB 560, in accordance with an embodiment of the disclosure.

Waveguide combiner 500 optionally comprises a prismatic input coupler 550 a first waveguide 530 and a second waveguide 630, in accordance with an embodiment of the disclosure. Input coupler 550 receives light from virtual images generated by a laser display engine 570 through input aperture 535 and inputs the light into waveguide 530. Waveguide 530 comprises first and second TIR face surfaces 531 and 532 respectively that are parallel, arbitrarily, to the xy-plane of coordinate system 100, and top and bottom surfaces 532 and 534. The waveguide has an output coupler 540 comprising a plurality of parallel facets 542 in accordance with an embodiment of the disclosure. Optionally, the facets are perpendicular to face surfaces 531 and 532 and are rotated about the z-axis by a tilt angle β*. Optionally, the facets are evenly spaced. Light rays in light received from input coupler 550 are repeatedly totally reflected by and bounced back and forth between TIR face surfaces 531 and 532 until they reach and are incident on facets 542 of output coupler 540. Facets 542 are distributed over a relatively extended distance in the x-axis direction and reflect the light rays out of waveguide 530 in a general direction of the minus y-axis and into waveguide 630 through an extended output aperture 545 that expands input aperture 535 in the x-direction. Waveguide 630 may be any waveguide configured to receive light from an image generated by a display engine via an input aperture such as input aperture 535 and project the received light out from the waveguide via an output coupling region such as output coupling region 545 that is expanded substantially in a single direction.

Waveguide 630 is assumed by way of example to be similar to waveguide 30, comprises facets 42 and TIR face surfaces 31 and 32 that are parallel to the xy-plane and are optionally continuous with face surfaces 531 and 532 respectively. Waveguide 630 expands the image in 545 of waveguide 530 in the minus y-direction and reflects the light it receives from waveguide 530 through an output coupling region 536 extended in both the x and y directions into EMB 560. It is noted that whereas waveguide 630 is assumed similar to waveguide 30 shown in FIG. 1A, waveguide 630 may be similar to any of various waveguides, for example waveguide 330 (FIG. 2A) or waveguide 430 (FIG. 3A) comprising facets and configured in accordance with an embodiment of the disclosure.

Equations 25) and 26) may be chained to relate desired constraints on an output field of view that waveguide combiner 500 provides for EMB 560. Let upward and downward directed light rays propagating in waveguide 530 relative to face surfaces 531 and 532 be represented by vectors $v_u(530)$ and $v_d(530)$, then $$v_d(630)=(v_u(630)-(2v_u(630)\cdot n_w)n_w, \qquad 31)$$

where $n_w$ is a normal to face surfaces 531, 532, 31, and 32 in waveguide combiner 500 and upward and downward directed light rays are arbitrarily considered to be traveling in the minus and plus z-directions respectively. One of the upward and down directed groups of light rays propagating in waveguide 530 is reflected by facets 542 into waveguide 630. By way of example assume that $v_u(530)$ light rays are reflected into waveguide 630. Then, since reflection by a facet 542 does not change a component of a light ray propagation in the z-direction a $v_u(530)$ light ray after reflection by a facet 542 enters waveguide 630 as an upward directed light ray relative to face surfaces 31 and 32. Let the upward directed light ray after entry into waveguide 630 be represented by $v_u(630)$. Then, as a result of reflection into waveguide 630 by a facet 542 in waveguide 530, upon entry into waveguide 630 light ray $v_u(630)$ has a direction given by $$v_u(630)=v_u(530)-2(v_u(530)\cdot n_f(542)n_f \qquad 32)$$

After reflection by face surface 32, upward directed $v_u(630)$ "becomes" a downward directed light ray $v_d(630)$, where $$v_d(630)=v_u(630)-2(v_u(630)\cdot n_w)n_w \qquad 33)$$

Upward and downward directed light rays in waveguide 630 are contained respectively in upward and downward directed fields of view wFOV-U and wFOV-D as schematically shown in FIGS. 1A, 2A, and 3A. And in accordance with an embodiment, light rays in one of wFOV-U and wFOV-D in waveguide 630 are selected for reflection by facets 42 through output coupling region 536 in an output field of view O-FOV into EMB 560. Desired constraints on light rays in O-FOV may be back propagated to harmonize tilt angles β and β* that characterize facets 42 and 542 in waveguides 30 and 530.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A waveguide combiner comprising:
    a first waveguide comprising first and second parallel totally internal reflecting face surfaces having a normal "$n_w$";
    an input aperture through which light enters the first waveguide;
    an output coupling configuration associated with an output coupling region, which expands the input aperture in at least one direction, and through which light that enters the first waveguide exits the first waveguide; and
    an output coupler configured for use with at least one laser, and comprising a plurality of parallel facets embedded in the first waveguide and having a facet tilt angle β between $n_w$ and a normal "$n_f$" to the facets which facets reflect light that propagates along the first waveguide and is incident on the facets out through the output coupling region, each of the facets having a coating providing:
        a facet wavelength band for a lasing band of light provided by the at least one laser that includes wavelengths of light in the lasing band and in a range of wavelengths over which the lasing band is expected to vary;

a reflectivity angular range exhibiting a first reflectivity for light having a wavelength in the facet wavelength band that propagates in the first waveguide and is incident on the facets in a first range of incident angles;

a transmittance angular range exhibiting a second reflectivity less than the first reflectivity for light having a wavelength in the facet wavelength band that propagates in the first waveguide and is incident on the facets in a second range of incident angles; and a see-thru angular transmittance range having high transmittance for natural light incident on the facets in a third range of incident angles.

2. The waveguide combiner according to claim 1, wherein for each facet wavelength band reflectivity for wavelengths in the band varies by less than an upper bound relative to an average reflectivity in the wavelength band so that a color gamut chromaticity discrepancy radius "$\Delta CG$" in a CIE 1931 xy chromaticity space is less than or equal to about 0.02.

3. The waveguide combiner according to claim 2, wherein if an average reflectivity for wavelengths in the facet wavelength band is represented by R, and a maximum difference between reflectivity for a wavelength in the facet wavelength band and R is represented by $\Delta R$, then $|\Delta R|/R$ is less than or equal to about 3%.

4. The waveguide combiner according to claim 1, wherein the lasing band comprises one of a red, green, and/or blue lasing band.

5. The waveguide combiner according to claim 1, wherein the facet wavelength band for the lasing band has a bandwidth greater than or equal to three or greater than or equal to four times the bandwidth of the lasing band.

6. The waveguide combiner according to claim 1, wherein $(90°-\gamma)>\beta$, $\gamma>\theta_C$, where $\gamma$ represents an angle between $n_w$ and a direction of incidence on the face surfaces of a light ray that propagates in the first waveguide and from which the output coupler reflects light through the output coupling region out from the first waveguide, and where $\theta_C$ represents a critical angle of the first waveguide for light having a wavelength in the facet wavelength band.

7. The waveguide combiner according to claim 6,
wherein tilt angle $\beta$ satisfies a constraint $(\theta_C+\alpha_+)/2<\beta<(30°+\alpha_-/3)$, where $\alpha_+$ and $\alpha_-$ are angles in a plane perpendicular to the face surfaces and to the facets that the normal to the face surfaces make with directions along which the facets reflect incident light out from the first waveguide, where $\alpha_+$ is greater than $\alpha_-$ and positive if rotated clockwise and negative if rotated counterclockwise with respect to the normal, and wherein $\alpha_+$ and $\alpha_-$ respectively determine minimum and maximum values of $\gamma$ that define a field of view, wFOV, of light propagating in the first waveguide.

8. The waveguide combiner according to claim 7, wherein the reflectivity angular range spans a gamut of incident angles $\phi$ for which $(\beta-\alpha_+)\leq\phi\leq(\beta-\alpha_-)$.

9. The waveguide combiner according to claim 7, wherein the transmittance angular range spans a gamut of incident angles $\phi$ for which $(3\beta-\alpha_+)\leq\phi\leq(3\beta-\alpha_-)$.

10. The waveguide combiner according to claim 1, wherein $\beta>(90°-\gamma)$.

11. The waveguide combiner according to claim 10, wherein tilt angle $\beta$ satisfies a constraint $(30°+\alpha_+/3)<\beta<(45°+\alpha_-/2)$.

12. The waveguide combiner according to claim 11, wherein the reflectivity angular range spans a gamut of incident angles $\phi$ for which $(\beta-\alpha_+)\leq\phi\leq(\beta-\alpha_-)$.

13. The waveguide combiner according to claim 11, wherein the transmittance angular range spans a gamut of incident angles $\phi$ for which, $(180°-3\beta+\alpha_-)\leq\phi\leq(180°-3\beta+\alpha_+)$.

14. The waveguide combiner according to claim 10, wherein tilt angle $\beta$ satisfies a constraint $45°-\alpha_-/2<\beta<90°-(\alpha_++\theta_C)/2$.

15. The waveguide according to claim 14, wherein the reflectivity angular range spans a gamut of incident angles $\phi$ for which $(\beta+\alpha_-)\leq\phi\leq(\beta+\alpha_+)$.

16. The waveguide combiner according to claim 14, wherein the transmittance angular range spans a gamut of incident angles $\phi$ for which, $(180°-3\beta-\alpha_+)\leq\phi_u\leq(180°-3\beta-\alpha_-)$.

17. The waveguide combiner, according to claim 1 and comprising a second waveguide having a second input aperture and a second output coupling region through which light received through the second input aperture exits the second waveguide and enters the first waveguide and wherein the second output coupling region is expanded relative to the second input aperture in a direction different from the at least one direction in which the output aperture of the first waveguide is expanded.

18. A waveguide combiner comprising:

a first waveguide comprising first and second parallel totally internal reflecting face surfaces having a normal "$n_w$";

an input aperture through which light enters the first waveguide;

an output coupling configuration associated with an output coupling region, which expands the input aperture in at least one direction, and through which light that enters the first waveguide exits the first waveguide; and an output coupler configured for use with at least one laser, and comprising a plurality of parallel facets embedded in the first waveguide and having a facet tilt angle $\beta$ between $n_w$ and a normal "$n_f$" to the facets which facets reflect light that propagates along the first waveguide and is incident on the facets out through the output coupling region, the facets having:

a facet wavelength band for a lasing band of light provided by the at least one laser that includes wavelengths of light in the lasing band and in a range of wavelengths over which the lasing band is expected to vary;

a reflectivity angular range exhibiting a first reflectivity for light having a wavelength in the facet wavelength band that propagates in the first waveguide and is incident on the facets in a first range of incident angles;

a transmittance angular range exhibiting a second reflectivity less than the first reflectivity for light having a wavelength in the facet wavelength band that propagates in the first waveguide and is incident on the facets in a second range of incident angles; and a see-thru angular transmittance range having high transmittance for natural light incident on the facets in a third range of incident angles, wherein $(90°-\gamma)>\beta$, $\gamma>\theta_C$, where $\gamma$ represents an angle between $n_w$ and a direction of incidence on the face surfaces of a light ray that propagates in the first waveguide and from which the output coupler reflects light through the output coupling region out from the first waveguide; and where $\theta_C$ represents a critical angle of the first waveguide for light having a wavelength in the facet wavelength band, wherein tilt angle $\beta$ satisfies a constraint $(\theta_C+\alpha_+)/2<\beta<(30°+\alpha_-/3)$, where $\alpha_+$ and $\alpha_-$ are angles in a plane perpendicular to the face surfaces and to the facets that the normal to the face surfaces make with directions along which the facets reflect incident light out from the first waveguide, where $\alpha_+$ is greater than $\alpha_-$ and positive if rotated clockwise and negative if rotated counterclockwise with respect to the normal, and where $\alpha_+$ and $\alpha_-$ respectively determine minimum and maximum values of $\gamma$ that define a field of view, wFOV, of light propagating in the first waveguide, wherein the reflectivity angular range spans a gamut of incident angles $\phi$ for which $(\beta-\alpha_+)\leq\phi\leq(\beta-\alpha_-)$, and wherein the transmittance angular range spans a gamut of incident angles $\phi$ for which $(3\beta-\alpha_+)\leq\phi\leq(3\beta-\alpha_-)$.

* * * * *